(12) United States Patent
Doucet

(10) Patent No.: US 9,017,752 B2
(45) Date of Patent: Apr. 28, 2015

(54) SHORTENING COMPOSITION

(75) Inventor: Jim Doucet, Olathe, KS (US)

(73) Assignee: Dupont Nutrition Biosciences APS, Copenhagen (DK)

( * ) Notice: Subject to any disclaimer, the term of this patent is extended or adjusted under 35 U.S.C. 154(b) by 1618 days.

(21) Appl. No.: 11/079,980

(22) Filed: Mar. 15, 2005

(65) Prior Publication Data

US 2005/0214436 A1    Sep. 29, 2005

Related U.S. Application Data

(60) Provisional application No. 60/553,083, filed on Mar. 15, 2004, provisional application No. 60/611,130, filed on Sep. 17, 2004.

(51) Int. Cl.

| | | |
|---|---|---|
| A23D 9/00 | (2006.01) | |
| A23D 9/013 | (2006.01) | |
| A21D 13/00 | (2006.01) | |
| A21D 2/16 | (2006.01) | |
| A21D 13/08 | (2006.01) | |
| A23D 9/007 | (2006.01) | |

(52) U.S. Cl.
CPC .............. *A21D 13/0067* (2013.01); *A21D 2/16* (2013.01); *A21D 13/08* (2013.01); *A23D 9/007* (2013.01); *A23D 9/013* (2013.01)

(58) Field of Classification Search
None
See application file for complete search history.

(56) References Cited

U.S. PATENT DOCUMENTS

| | | | | |
|---|---|---|---|---|
| 3,563,766 A | * | 2/1971 | Matsui | 426/606 |
| 3,785,831 A | * | 1/1974 | Willock | 426/570 |
| 4,137,338 A | * | 1/1979 | Gawrilow | 426/601 |
| 4,226,894 A | * | 10/1980 | Gawrilow | 426/606 |
| 4,359,482 A | * | 11/1982 | Crosby | 426/606 |
| 4,504,510 A | | 3/1985 | Aliberto et al. | |
| 5,254,356 A | | 10/1993 | Busken et al. | |
| 5,268,191 A | * | 12/1993 | Crosby | 426/606 |
| 5,658,609 A | | 8/1997 | Abboud et al. | |
| 5,908,655 A | | 6/1999 | Doucet | |
| 6,030,654 A | | 2/2000 | Thomas et al. | |
| 6,117,476 A | | 9/2000 | Eger et al. | |
| 6,156,369 A | | 12/2000 | Eger et al. | |
| 6,387,433 B1 | * | 5/2002 | Widlak | 426/606 |
| 7,172,784 B2 | * | 2/2007 | Prabhasankar et al. | 426/653 |
| 2002/0012739 A1 | * | 1/2002 | Cornelissen et al. | 426/606 |
| 2004/0137121 A1 | | 7/2004 | Eger et al. | |

FOREIGN PATENT DOCUMENTS

| | | |
|---|---|---|
| GB | 2 290 450 | 1/1996 |

OTHER PUBLICATIONS

Gunstone, , F. 1983. Lipids in Foods, Chemistry, Biochemistry and Technology. Pergamon Press Inc. New York, p. 148-151.*
Code of Federal Regulations. 2003. Code of Federal Regulations 21 CFR 101.62. pp. 104-107.*
Hui, Y. H. 1996. Bailey's Industrial Oil and Fat Products. $5^{th}$ edition, vol. 1. John Wiley & Sons, Inc. New York. p. 160-162, 235-238.*
Anonymous: Emulsifiers For The Preparation Of Active Dry Yeast (1983) vol. 236, No. 6, p. 376.
Dean D. Duxbury, Emulsifier Blends Enhance Cake Qualities, Food Processing (1992) vol. 53, No. 11, p. 59-60.
Abstract: Itou Tadashi, et al., Soluble Fat And Oil Composition, JP 56151454, Nov. 24, 1981.
"FDA takes step to further reduce trans fats in processed foods," News and Events. FDA News Release. http://www.fda.gov/NewsEvents/Newsroom/PressAnnouncements/ucm373939.htm. Nov. 7, 2013.

* cited by examiner

*Primary Examiner* — Carolyn Paden
(74) *Attorney, Agent, or Firm* — Vedder Price P.C.; Thomas J. Kowalski; Deborah L. Lu

(57) ABSTRACT

The present invention relates to a shortening system for use as dough fat or filling fat. The shortening system contains unhydrogenated or non-hydrogenated vegetable oil, such as a highly unsaturated, non-hydrogenated or unhydrogenated vegetable oil, e.g., soybean oil, sunflower oil, corn oil, rice-bran oil, or cottonseed oil and a minimum or minor amount (e.g., by weight about 3-10%, advantageously about 3-7%, more advantageously about 3-6% or about 3-5% or less than about 6% or less than about 8%) of an emulsifier composition The emulsifier composition comprises a monoglyceride and/or diglyceride, an alpha tending emulsifier and an ionic emulsifier. Methods for making and using such a shortening system and products from the use of such a shortening system are also disclosed.

86 Claims, No Drawings

SHORTENING COMPOSITION

REFERENCE TO RELATED APPLICATIONS

This application claims priority from U.S. Provisional Patent Application Nos. 60/553,083 filed Mar. 15, 2004 and 60/611,130 filed Sep. 17, 2004. These applications, and each application and patent mentioned in this document, and each document cited or referenced in each of the above applications and patents, including during the prosecution of each of the applications and patents ("application cited documents") and any manufacturer's instructions or catalogues for any products cited or mentioned in each of the applications and patents and in any of the application cited documents, are hereby incorporated herein by reference. Furthermore, all documents cited in this text, and all documents cited or referenced in documents cited in this text, and any manufacturer's instructions or catalogues for any products cited or mentioned in this text, are hereby incorporated herein by reference. However, none of the documents incorporated by reference into this text is admitted to be prior art with respect to the present invention, but, documents incorporated by reference into this text may be employed in the practice of the invention.

It is noted that in this disclosure, terms such as "comprises", "comprised", "comprising", "contains", "containing" and the like can have the meaning attributed to them in U.S. Patent law; e.g., they can mean "includes", "included", "including" and the like. Terms such as "consisting essentially of" and "consists essentially of" have the meaning attributed to them in U.S. Patent law, e.g., they allow for the inclusion of additional ingredients or steps that do not detract from the novel or basic characteristics of the invention, i.e., they exclude additional unrecited ingredients or steps that detract from novel or basic characteristics of the invention, and they exclude ingredients or steps of the prior art, such as documents in the art that are cited herein or are incorporated by reference herein, especially as it is a goal of this document to define embodiments that are patentable, e.g., novel, non-obvious, inventive, over the prior art, e.g., over documents cited herein or incorporated by reference herein. And, the terms "consists of" and "consisting of" have the meaning ascribed to them in U.S. Patent law; namely, that these terms are closed ended.

FIELD OF THE INVENTION

The present invention relates to an emulsifier composition, a shortening composition comprising such an emulsifier, to the use of the shortening composition as dough fat or filling fat; for instance, a shortening system containing, consisting essentially of, or consisting of, unhydrogenated or non-hydrogenated vegetable oil, such as a highly unsaturated, non-hydrogenated or unhydrogenated vegetable oil, e.g., soybean oil, sunflower oil, corn oil, ricebran oil, or cottonseed oil and a minimum or minor amount (e.g., by weight about 3-10%, advantageously about 3-7%, more advantageously about 3-6% or about 3-5% or less than about 6% or less than about 8%) of an emulsifier composition containing consisting essentially of, or consisting of, a monoglyceride and/or diglyceride, an alpha tending emulsifier and an ionic emulsifier as well as to methods for making and using such a shortening system and products from the use of such a shortening system.

BACKGROUND

Fatty acids are composed of a carboxyl group and a hydrocarbon chain. Individual fatty acids are distinguished from one another by the nature of the hydrocarbon chain. This chain can vary in length from 4 to 24 carbon atoms and can be saturated, monounsaturated (one double bond, MUFA) or polyunsaturated (two or more double bonds, PUFA). The most common fatty acids in edible oils and fats are those containing 18 carbons. These include: stearic acid (a saturated fatty acid), oleic acid (a monounsaturated fatty acid), and linoleic and linolenic acids (polyunsaturated fatty acids containing two and three double bonds, respectively). The configuration of octadecanoic fatty acids is as follows:

| Formula | Common Name | Abbreviation |
|---|---|---|
| [structure]COOH | Stearic | 18:0 |
| [structure]COOH | Oleic | 18:1 n-9 cis |
| [structure]COOH | Linoleic | 18:2 n-6 cis |
| [structure]COOH | Linolenic | 18:3 n-3 cis |
| [structure]COOH | Elaidic | 18:1 n-9 trans |

Fatty acid abbreviations are made according to the number of carbon atoms in the molecule and the number of cis ethylenic double bonds. The general assumption is that all multiple double bonds are methylene-interrupted. The chemical nomenclature requires that carbon atoms be counted from the carboxyl end of the fatty acid. However, for biological activity carbon atoms are numbered from the terminal methyl group to the first carbon of the ethylenic bond. Such a classification is designated by the symbol $\overline{\omega}$-x, $\overline{\omega}$-x, or n-x, nx, where x denotes the position of the double bond closest to the terminal methyl group. For example, linoleic acid with two double bonds, where one is located on the sixth carbon atom counted from the methyl group, will be abbreviated as C18:2n-6.

In the case of unsaturated fatty acids, the carbon chain is bent into a fixed position at the double bond, resulting in several possible geometric isomers. When the portions of the chain are bent towards each other they are called cis; and when bent away from each other, trans. The natural configuration of fatty acids is cis, as shown for oleic acid. The corresponding trans configuration, elaidic acid, results in a straight chain.

Currently in the U.S., partially hydrogenated fats are employed in the production of many chemically leavened and yeast-raised bakery products (e.g., cakes, crackers, cookies, cereal bars, etc.). The partial hydrogenation of domestic oils originating from soybean, cottonseed, corn, sunflower, and/or canola allow the chemical reduction of the unsaturated fatty acids to saturated fatty acids which provide greater oxidative stability.

Hydrogenation is a physical modification of these liquid oils, imparting thereto a solid fat content and an increased melting point, as saturated fatty acids are solid at room temperature whereas unsaturated fatty acids are liquid at room temperature As a result, the oils which are naturally liquid can be transformed into a semi-solid fat with a particular melting profile. To provide maximum eating pleasure with this form of the fats, the hydrogenation process of these fats is highly controlled and allowed to proceed only partially, that is, to allow only some of the unsaturated fatty acids and/or bonds thereof to be reduced to the saturated form. These types of fats and fatty acids are called "partially hydrogenated fats" or "partially hydrogenated oils" or "partially hydrogenated fatty acids".

In addition to the reduction of the unsaturated fatty acids to the saturated form, in partial hydrogenation, a side reaction occurs in which the natural form of the unsaturated bond (referred to as a cis isomer) will twist in the plane, to form what is referred to as a trans isomer of the bond of the of the unsaturated fatty acid.

Generally, cis isomers are those naturally occurring in food fats and oils. Although very small amounts of trans isomers occur in fats from ruminants or can result from the deodorization step in refining of vegetable fats and oils, most trans isomers result from the partial hydrogenation of fats and oils. Also, it is possible for the unsaturated bond to move laterally along the fatty acid chain and this is referred to as a positional isomer. These isomers are formed at the high temperatures (e.g., 180°-240° C.) common during the hydrogenation reaction and when the Nickel catalyst typically employed during the hydrogenation reaction unsuccessfully introduces a hydrogen atom to both sides of the unsaturated bond. These isomers are rather stable and will then remain unless the hydrogenation reaction is continued until there is a complete reduction of the unsaturated fatty acids. Therefore, partially hydrogenated fat will always contain some proportion of these positional and geometrical isomers; and, those isomers, especially those that do not naturally occur in fats, can present problems.

For instance, typically, shortenings employed in bakery products may contain 15-35% trans isomers. The use of these isomers has become more scrutinized by nutritional science in the last several years. There have been clinical studies reporting observed negative health effects correlated to the presence of trans fatty acids formed during the partial hydrogenation of oils, e.g., a positive correlation with coronary heart diseases an increase in the ratio of plasma low density lipoproteins (LDL) to high density lipoproteins (HDL) and thus a possible increase in the risk of coronary heart disease (see, e.g., Elias, B. A., Food Ingredients Europe: Conference proceedings, London, October 1994 (Publisher: Process Press Europe, Maarssen); Willet, W. C. et al., Lancet 341 (8845); 581-585 (1993); Khosla, P. et al., J. Am. Col. of Nutrition, August 1996, 15(4):325-339 (American College of Nutrition, NY, N.Y.)).

However, not all trans fatty acids are necessarily "bad"; and, other, including more recent, studies have shown that trans fatty acids may not have such a correlation with coronary heart disease and/or may be akin to saturated fatty acids, fats or oils. Cf. Clarke et al., "Dietary lipids and blood cholesterol: quantitative meta-analysis of metabolic ward studies" *BMJ* 1997; 314:112 (11 January) (Forty solid food experiments provided information on dietary intake of trans monounsaturated fats, mainly trans C18:1; elaidate: trans fatty acids account for only 2% of calories in the British diet, so replacing half isocalorically by carbohydrates would be expected to reduce blood total cholesterol by only 0.05 (0.01) mmol/l; however, intake of monounsaturated fat had no significant effect on total or low density lipoprotein cholesterol despite raising high density lipoprotein cholesterol by about as much as polyunsaturates; "combined effect of changing the type, but not the amount, of dietary fat by replacement of 10% of dietary calories from saturates by monounsaturates (5%) and by polyunsaturates (5%), together with consuming 200 mg less dietary cholesterol, would be a reduction in blood cholesterol of about 0.8 mmol/l, with the reduction chiefly in low density lipoprotein cholesterol"); Khosla et al. "Replacing Dietary Palmitic Acid with Elaidic Acid (t-C18:1Δ9) Depresses HDL and Increases CETP Activity in Cebus Monkeys," The Journal of Nutrition Vol. 127 No. 3 March 1997, pp. 531S-536S (palmitic acid- and elaidic acid-rich diets produced identical effects on LDL metabolism in normocholesterolemic cebus monkeys fed diets with low levels of cholesterol); McMillan et al. "Elaidinized olive oil and cholesterol atherosclerosis," B. I. Arch. Pathol. 76:106-12 (1963) (in rabbits trans fatty acids have been shown to raise cholesterol levels but do not increase the severity of atherosclerosis); van de Vijver et al. "Trans unsaturated fatty acids in plasma phospholipids and coronary heart disease: a case-control study," Atherosclerosis 1996 Sep. 27; 126(1):155-61 (no significant correlations were found between percentages of trans fatty acids in plasma phospholipids and plasma LDL or HDL cholesterol levels; findings do not support an association between trans fatty acid intake and risk for coronary heart disease); van de Vijver et al. "Association between trans fatty acid intake and cardiovascular risk factors in Europe: the TRANSFAIR study," Eur J Clin Nutr 2000 Feburary; 54(2):126-35 (while high intakes of trans fatty acids (TFA) have been asserted by others to exert an undesirable effect on serum lipid profiles, no associations were found between total TFA intake and LDL, HDL or LDL/HDL ratio after adjustment for cardiovascular risk factors; additional adjustment for other fatty acid clusters resulted in a significant inverse trend between total TFA intake and total cholesterol (Ptrend<0.03)—the most abundantly occurring TFA isomer, C18:1t, contributed substantially to this inverse association; and, at the current European intake levels of trans fatty acids they are not associated with an unfavorable serum lipid profile).

Furthermore, it is important to note that the majority of trans isomers formed during partial hydrogenation of vegetable oils and fats are in different positions along the fatty-acid backbone (primarily elaidic) than those that occur naturally in animal fats (vaccenic) and that fats from ruminants reportedly account for 20% to 25% of TFA (trans fatty acid) intake. Thus, trans fats from animal and vegetable sources may present different associations with risk factors for heart disease. Indeed, since the trans form of fats may provide many of the same properties as saturates, it has been commonly referred to as the stealth fat.

Accordingly, as there seems to be reports weighing in on both sides of the "trans fat issue", and the source of the trans fat—animal vs. vegetable—may impact upon risk factors, there may there may be a problem in the art in the use of large or significant amounts of partially hydrogenated fats and oils in food products; and, the American Heart Association recommends using naturally occurring unhydrogenated oil when possible.

Moreover, the problems presented by partially hydrogenated fats or oils cannot be addressed by merely employing naturally saturated fats or oils; and, the use of naturally saturated fats and oils present problems.

For instance, as many nutritionists caution against replacing TFAs in the diet with saturates, especially palmitic acid, it is now not recommended to substitute trans fats and oils with saturated fats and oils; and, the substitution may result in little biological significance (see literature cited supra). Indeed, saturated fatty acids may cause greater health issues than TFAs as saturated fatty acids (i.e. palmitic acid) may raise total cholesterol mostly due to an increase in low-density lipoprotein (LDL) cholesterol from saturated fatty acids.

Another possible replacement for partially hydrogenated fats or oils is interesterified fats that may be engineered from fully refined liquid oils and fully hydrogenated fats. These engineered interesterified fats are from a process wherein the fatty acids on the triglycerides of two fats are randomized via a chemical catalyst or enzyme, resulting in a triglyceride composition that can provide a suitable melting profile. Ideally, the selection of oils for this process may include a non-hydrogenated oil and either a tropical fat (such as coconut oil, palm kernel oil, and/or palm oil or fractions thereof), which is naturally high in saturates, or a fully hydrogenated fat, which is fully saturated and without TFAs. The ratio of the oils and fats may be selected to mimic properties of partially hydrogenated fats. In addition, these engineered fats can be processed to conserve TFAs. However, an unfortunate shortcoming of engineered fats may be the potential increase in saturated fat depending on its application. In addition, a food manufacturer or processor would be required to declare the fully hydrogenated or tropical fat on its product label, which may be unfavorable to a consumer as these fats are associated with the formation of TFAs and/or with high saturates content.

Polyunsaturated fatty acids are considered a highly essential component of a healthy diet according to the U.S. Food and Nutritional Board's Recommended Dietary Allowances (tenth ed. 1989) (e.g., amount of dietary linoleic acid for humans should be a minimum of 2% of dietary calories and preferably 3%; and, the requirement for linolenic acid has been estimated to be 0.54% of calories)

While it would be desirable to replace partially hydrogenated fats simply with natural vegetable oils since natural vegetable oils have a relatively high ratio of polyunsaturated to saturated fatty acids, attempts to do this so far have also proven to be quite unsatisfactory in regard to either the processing or organoleptic (e.g., taste, texture, eating) aspects of the food product. For example, there may be insufficient oil retainment in the dough or batter resulting in separation of oil. Or, the liquid oil may render the dough or the like sticky or long in texture preventing the required sheeting, cutting, molding, or extrusion during processing. Further, oils may depart from the food product too quickly in the mouth, imparting an off-taste and off-feel to the product as it is being consumed.

Another related problem in the preparation of food products is "bloom"; a phenomenon wherein certain fats or oils permeate to the surface of a food product, such as a cookie, and leave a scoring on the surface of the food product. This "bloom" renders the food product not visually appealing and ergo not consumable. It would be desirable to provide a shortening system which does not suffer from "bloom."

In the production of food surfactants or emulsifiers, a triglyceride may be reacted with glycerol and to form a mixture of mono- and diglycerides. Thus, the products from this reaction is typically subjected to a treatment to isolate a monoglycerides product from a diglycerides and triglycerides product; the diglycerides and triglycerides product is considered a by-product of the reaction of a triglyceride with a glycerol to obtain monoglycerides for surfactants or emulsifiers. The diglycerides and triglycerides product is sometimes discarded, or recycled back to a reactor wherein the reacting with glycerol is occurring so as to enhance the production of monoglycerides (see, e.g., Lauridsen, "Food Surfactants, Their Structure And Polymorphism" Technical Paper TP 2-1e Danisco Ingredients, Braband Denmark, and references cited therein).

Systems functioning as or containing fats or oils have been proposed (see, e.g., CN 1078353, U.S. Pat. Nos. 5,458,910, 5,612,080, 5,306,514, 5,306,515, 5,306,516, 5,254,356, 5,061,506, 5,215,779, 5,064,670, 5,407,695, 4,865,866, 4,596,714, 4,137,338, 4,226,894, 4,234,606, 4,335,157, 3,914,452, 3,623,888, DE 291240A). In addition, reference is made to U.S. Pat. No. 5,908,655 and EP1057887A1, and documents cited therein including, U.S. Pat. Nos. 2,132,437, 2,442,534, 3,943,259, 4,018,806, 4,055,679, 4,154,749, 4,263,216, 4,366,181, 4,386,111, 4,425,371, 4,501,764, 4,510,167, 4,567,056, 4,596,714, 4,656,045, 4,732,767, 4,889,740, 4,961,951, 5,110,509, 5,211,981, 5,316,927, 5,434,280, 5,439,700, 5,458,910, 5,470,598, 5,589,216, 5,612,080, 5,718,938, and 5,756,143; and, Feuge et al., Modification of Vegetable Oils VI: The Practical Preparation of Mono and Diglycerides, Oil and Soap, 23 (259-264), 1946; Handbook of Food Additives, 2nd Edition, vol. 1, Chapter 9, Surface Active Agents, pp. 397-429; Bailey's Industrial Oil and Fat Products, 4th Edition, vol. 2, Chapter 4, pp. 130-147; and Krog, "Interactions of Surface-Active Lipids with Water, Protein and Starch Components in Food Systems," Technical Paper TP 3-1e , Danisco Ingredients, Braband, Denmark.

However, these systems have not sufficiently addressed the problems in the art; and, these systems have not been reported to provide the synergistic, and surprisingly superior properties for processability, including improvement in organoleptic properties of foodstuff, of the present invention. Further, these systems may not sufficiently address new or additional issues that have arisen in the art.

More in particular, partially hydrogenated (PH) fats are used in bakery and bakery related food used as shortenings, such as dough fat or filling fat. These fats may provide specific functional characteristics to a food product, such as aeration properties, emulsification properties, lubrication, organoleptic properties, structural stability, and increased shelf life.

For example, PH fats may serve to lubricate the dough or the like to provide good organoleptic properties. That is, PH fats are utilized to help shorten the texture of a food product to enhance the palatability of the baked item. Further, PH fat serves to lubricate dough or the like to provide necessary shortness during processing resulting in an even distribution of fermentation gasses so that the food products exhibits less deformities and imperfections.

Also, PH fats aid in the development or in the stability of the food product structure during production or in the finished good for a variety of baked goods, including cakes, extruded and sheeted baked goods, molded, or machine deposited (wire cut) cookies.

These functional characteristics may be limited by the type of shortening (i.e. solid fat index, the presence of emulsifiers), the level of shortening, and the manner in which it is added, for example, how well the fat is dispersed or applied.

In addition, emulsifiers have been utilized in bakery related items such as cookies, cakes, and other chemically leavened fine bakery items for quite some time. For example, mono- and diglycerides and lecithin have utilized in bakery shortenings to facilitate creaming and to increase the shortening effect, i.e. to spread fat to a further degree. Also, such emulsifiers have been utilized in partially hydrogenated bakery fats to enhance lubrication. As a further example, emulsifiers, such as mono- and diglycerides, propylene glycol esters of fatty acids, lactic acid esters, polysorbates, and sorbitan esters, have been utilized to strengthen cake batter during preparation for aiding in aeration. By strengthening the batter, the final cake will have a finer cell structure resulting in better organoleptic properties and better overall appearance.

New labeling requirements ("nutritional panel issues") for trans fats have been proposed and as a result manufacturers will attempt to conserve or reduce the level of trans by replacing the current partially hydrogenated fats with options such as: (1) Blend of fully refined oils with fully hydrogenated fats; (2) Interesterification of fully refined oils with fully hydrogenated oil and/or tropical fats or tropical fat fractions; and (3) Blends of domestic oils with tropical fats and or tropical fat fractions.

Disadvantages for these options would include possible functional problems or marketing issues.

For example, in options (1) or (2), the declaration of hydrogenated fats would be a marketing problem due to the association of trans fatty acids with hydrogenation. In addition, from a functional point of view, option (1) would provide high melting solids which may result in waxiness and/or dryness in the mouth, leading to poor flavor release. Further, for options (2) and (3), the declaration of a fully hydrogenated oil and/or tropical fats would be a marketing problem due to the association of saturated fats and tropic fats.

Thus, for instance, U.S. Pat. No. 5,908,655 and EP1057887A1 provide a shortening system. The shortening system comprises an admixture of at least one non-hydrogenated vegetable oil and at least one isolated stearine fraction obtainable from glycerolysis/interesterification of a fat or oil, wherein the isolated stearine fraction has an enhanced concentration of diglycerides.

In these documents, the monoglyceride of the shortening system is one which is normally solid at room temperature, or one which is a stearine fraction, or one that is with a diglyceride and is a stearine fraction or normally solid at room temperature, e.g, monoglycerides and diglycerides derived from fats and oils such as palm stearine that are high in saturated fatty acids. The marketing issue of the association of saturated fats and tropic fats is not addressed in these documents.

It would be advantageous and an advance in the art to provide a shortening system, such as dough fat or filling fat, that addresses issues in the art and is useful for the production and stabilization of bakery related products, such as cookies, crackers, and assorted baked goods which are sheeted, extruded, and/or laminated.

OBJECTS AND/OR SUMMARY OF THE INVENTION

In view of the state of the literature on TFAs and the caution against replacing TFAs with saturates, the use of the emulsifier composition of the present invention containing or consisting essentially of a minor amount saturates and TFA, for example, to improve the organoleptic and physical properties of a non-hydrogenated or highly unsaturated vegetable oil, may address issues in the art, without presenting a significant health risk (See also van de Vijver et al. 1996, supra; van de Vijver et al. 2000, supra). Moreover, as demonstrated herein, inventive shortening systems with a conserved amount of trans fat, can provide overall less trans fat and saturated fat than hydrogenated fats or oils, and an advantageous nutritional panel; and thus, the present invention can even address the "trans fat issue", if it is an issue, as well as nutritional panel issues.

This invention pertains to a shortening system including a non-hydrogenated oil, and an emulsifier composition including mono- and diglycerides, an alpha tending emulsifier, for example, propylene glycol esters, lactic acid esters, acetic acid esters or combinations thereof, and an ionic co-emulsifier, for example, sodium stearoyl lactylate ("SSL"), diacetyl tartaric acid esters of monoglycerides ("DATEM"), lecithin, or combinations thereof.

The mono- and diglycerides may further contain saturated esters (e.g., palmitic, stearic, or combinations thereof) as the major fraction with appreciable or minor amounts of both glycerol mono oleate and glycerol mono elediate. The monoglyceride can be derived from highly unsaturated fats such as soybean, canola, cottonseed, sunflower, palm or blends thereof which have been fully refined, partially hydrogenated, fully hydrogenated, or blends thereof.

The alpha tending emulsifier may contain saturated esters (e.g., palmitic, stearic or combinations thereof) as the major fraction with minor amounts of both glycerol mono oleate and glycerol mono elediate. The alpha tending emulsifier may be derived from highly unsaturated fats such as soybean, canola, cottonseed, sunflower, palm or blends thereof which have been fully refined, partially hydrogenated or fully hydrogenated, or blends thereof.

The ionic co-emulsifier may be derived from highly unsaturated fats such as soybean, canola, cottonseed, sunflower, palm or blends thereof which have been fully refined partially hydrogenated fully hydrogenated, or blends thereof. Further, lecithin may be obtained by degumming oils such as soybean and corn. The lecithin, which comprises predominantly phospholipids and glycolipids, may then be further treated and purified.

The inventive shortening system can be prepared from several methods. One method is to physical blend or admix the non-hydrogenated oil and the components of the emulsifier composition. The mixture may be heated to facilitate melting and solubilization of the emulsifier composition in the non-hydrogenated oil. Such a method may be performed with the addition of each emulsifier component at one location via one step or at multiple locations in a stepwise fashion. For example, the monoglyceride and the alpha tending emulsifier (i.e. propylene glycol esters or lactic acid esters of monoglycerides) may be solubilized at one location with the addition of the ionic co-emulsifier (i.e. SSL, DATEM or lecithin) followed at a latter time at another location. The latter being favorable in some instances due to the limited stability of SSL at elevated temperatures.

Another method of preparation is to heat the components of the emulsifier composition separately or together to an elevated temperature sufficient to provide liquidity, e.g. to within plus or minus 10° C. of its melting point then adding the component mixture directly to the non-hydrogenated oil, which may be pre-heated. Blending is continued until the emulsifier components are completely in solution, i.e., completely dissolved in the non-hydrogenated oil.

The inventive shortening prepared by either method can then be maintained at a sufficient temperature to maintain solubilization before direct addition to foodstuff. As such, the shortening system upon contact with the other components of the food system may cool to a lower temperature. This inventive shortening may also be allowed to cool to induce crystallization of the emulsifier components before addition to foodstuff. Such cooling can be facilitated via heat exchangers to induce rapid crystallization of the emulsifiers as well.

The inventive shortening composition is advantageously stored and used as a liquid, e.g., as a spray, or in an aerosol or atomized form. Thus, after preparation, the inventive shortening composition can be stored at a temperature to maintain it in a liquid state, i.e., to maintain the solution; and it can be used directly in the preparation of a foodstuff at or below the temperature required to maintain the solution. In addition, the liquid state of the inventive shortening composition can be rapidly cooled to a temperature of about 65-90° F. (about 18°-32° C.) followed by a post tempering step consisting of mechanical agitation for a sufficient time period to initiate the formation of stable, dispersed fat crystals in the oil prior to adding to other ingredients of a foodstuff.

For instance, the shortening system advantageously contains, or consists essentially of, or consists of, a minor amount of the emulsifier composition, such as, by weight (based on the total weight of the composition or system) about 3-about 10% or about 3-about 7% or about 4-about 6% or about 5%; or, less than 6-8% of the emulsifier composition, for example, less approximately 6% or less than approximately 8%, such as from about 1% or about 2% or about 3% to about 5% or about 7% or less than 6% or less than 8%, e.g., about 2% or about 3% or about 4% to approximately 5%.

The inventive emulsifier composition may include about 10-70 parts by weight mono- and diglycerides, about 20-70 parts by weight alpha tending emulsifier and less than about 15 parts by weight ionic co-emulsifier.

The shortening system similarly advantageously comprises, consists essentially of, or consists of, the unsaturated or un hydrogenated or non-hydrogenated, advantageously highly unsaturated and non-hydrogenated oil, in an amount by weight (based on the total weight of the composition or system), of more than 94-92%, or of about 97% to about 90%, or of about 97% to about 93%, or of about 96% to about 94%, or of about 95%, or of more than approximately 94%, or of more than approximately 92%; such as a system containing, or consisting essentially of, or consisting of, by weight (based on the total weight of the composition or system) from about 99% to about 95% of the oil, or, about 98% to about 95% of the oil, or, about 97% to about 95% of the oil, or, about 99% to about 93% of the oil, or, about 98% to about 93% of the oil, or, about 97% to about 93% of the oil, or about 96% to about 93% of the oil, or about 95% to about 93% of the oil, or, about 99% to about 94% of the oil, or, about 98% to about 94% of the oil, or, about 97% to about 94% of the oil, or of about 97% to about 95% of the oil; such as more than 92%, more than 94%, about 93%, e.g., about 99% or about 98% or about 97% or about 96% or approximately 95% oil.

The shortening system is preferably a multi-component system. A first component is a fully refined non-polar oil (triglyceride) and a second component is the emulsifier composition having a monoglyceride and/or diglyceride, an alpha tending emulsifier, and an ionic co-emulsifier. However, while the inventive shortening system is advantageously this multi-component system, it can be used with additional ingredients that are typically employed in shortening systems, with the understanding that such additional ingredients are not to detract from the novel or basic characteristics of the invention and are not to extend to embodiments found in the prior art.

Thus, for instance, while the inventive shortening system is advantageously a multi-component system, it can be used with or contain or consist essentially of or consist of additional ingredients typically employed in or with shortening systems, such as an antioxidant system, e.g., any desired antioxidant system, such as tocopherol, TBHQ, BHT, or propyl gallate, alone or in combination with metal scavengers such as citric acid, phosphoric acid, EDTA and the like, to increase the stability of the shortening system against oxidative reactions. Such antioxidants are used in amounts typically used in the art, e.g., about 0.05%-about 0.3%, for instance, about 0.1%-about 0.3%, such as about 0.2%, by weight of the total fat composition or fat system.

One can determine the amount of trans unsaturation of fatty acids without any undue experimentation, from documents cited herein or incorporated herein by reference and the knowledge in the art, see, e.g., Ratnayake, "Determination of trans unsaturation by infrared spectrophotometry and determination of fatty acid composition of partially hydrogenated vegetable oils and animal fats by gas chromatography/infra-red spectrophotometry: collaborative study," J AOAC Int 1995 May-June; 78(3):783-802. And one skilled in the art, can determine the content of saturated monoglycerides (e.g., glycerol monostearate, glycerol monopalmitate, and combinations thereof) in a mono- and diglyceride composition, without undue experimentation, e.g., from documents cited in or incorporated by reference into this disclosure and the knowledge in the art; for instance, using gas chromatography, infra-red spectroscopy/spectrophotometry and other analytical procedures).

Furthermore, the shortening system advantageously allows the ingredient declaration of the ultimate food product to avoid the listing of hydrogenated fats or oils, or tropical fats or oils such as palm oil, or of fats or oils that are highly saturated. That is, the ultimate food product need not list in its ingredient declaration hydrogenated fats or oils, or tropical fats or oils such as palm oil, or of fats or oils that are highly saturated, due to the shortening system; a clear advantage over that which has come before, such as U.S. Pat. No. 5,908,655 and EP1057887A1 and other prior documents in the art that do not necessarily seek to avoid the necessity to list or declare such ingredients (and indeed, certain documents in the art may even direct towards the use of hydrogenated fats or oils, or tropical fats or oils such as palm oil, or of fats or oils that are highly saturated or of a stearine fraction, in contrast to the instant invention).

The inventive shortening system allows for the conservation of trans fats or oils, as well as advantageously the conservation of saturated fats (i.e. palmitic, stearic).

Vegetable oils high in polyunsaturation such as soybean oil, canola oil, are advantageous to employ in the practice of the invention; and, in certain embodiments, such oils that have been partially and selectively hydrogenated may be employed.

The invention allows for the stabilization and entrainment of liquid oil in cookies, fillings, and related baked goods which are sheeted (laminated), extruded, and/or molded or machine deposited. Thus, the invention provides for uses of the shortening system of the invention.

Accordingly, the invention comprehends a foodstuff or food product, such as cookies, crackers, baked tortilla (advantageously soft) and assorted baked goods which are sheeted, extruded, and/or laminated, or other related baked food product and/or fillings that contains the shortening system of the invention, as well as means for preparing such a foodstuff or food product comprising, consisting essentially of or consisting of blending or mixing the inventive shortening of the present invention to form a foodstuff or food product, as well as improved methods for allowing or improving processability or for improving or increasing shelf life or for improving or enhancing organoleptic properties or mouthfeel or taste for such a foodstuff or food product comprising or consisting essentially of the inventive shortening system.

More in particular, shortenings, such as dough fats or filling fats, are employed in the formulation of said bakery related items. During the processing, the shortening system is added with the other ingredients (i.e. sugar, flour, water, leavening agents, flavors, etc.) at a level corresponding to 8-70% (flour basis) and mixed to form the dough. The inventive shortening system mimics a partially hydrogenated shortening and provides the required functional properties allowing the necessarily handling and machining properties without the associated shortcomings of the PH fats.

These and other embodiments are disclosed or are obvious from and encompassed by, the following Detailed Description.

DETAILED DESCRIPTION

The present invention involves a shortening system comprising, or consisting essentially of, or consisting of a non-hydrogenated oil and an emulsifier composition. The emulsifier composition may include mono- and diglycerides, an alpha tending emulsifier, and an ionic co-emulsifier.

This inventive shortening system mimics a partially hydrogenated shortening and provides the required functional properties allowing the necessarily handling and machining properties without the associated shortcomings of the partially hydrogenated fats.

Monoglycerides have polymorphic properties that allow them to exist in different crystal forms, for example, α, β, etc. That is, monoglycerides will crystallize in one form and may later transform to another. More specifically, monoglycerides will transform to the most energy conserving state, the β-form. Although the β-form is more stable, monoglycerides in the α form possess the properties desired for the baking industry. Monoglycerides can be influenced to remain in the α form in the presence of other polar lipids with larger polar heads, which are non-polymorphic.

Accordingly, the combination of alpha tending emulsifiers and ionic emulsifiers, at proper ratios, may influence monoglycerides to remain in the α form. For example, as the shortening of the present invention cools from melting, either prior to or during addition into a formulation directly, the emulsifier composition of the present invention (polar lipids) becomes insoluble resulting in the formation of crystals stable in the α form dispersed throughout the non-hydrogenated oil matrix. In their crystalline state, polar lipids are structured in bilayers with polar head groups orientated head to head separated by layers of solid hydrocarbon chains (fatty acid chains). The emulsifiers, when mixed with water during the formulation step, will spontaneously swell into a gel and remain in the α form. The formation of the alpha gel immobilizes water into the bilayer and builds viscosity and body. The formation of the alpha gel influences the monoglyceride to remain in the α form. In addition, liquid oil adheres to the gel and becomes less mobile.

The alpha tending emulsifiers of the present invention "tend" to stay in the α form and can influence, at the proper ratio, the polymorphic form of mono- and diglycerides to remain in the α form. These alpha tending emulsifiers exhibit the ability to swell to the alpha gel state mentioned above. The alpha tending emulsifiers of the present remain may include, but are not limited to, propylene glycol esters, lactic acid esters and acetic acid esters or combinations thereof and other emulsifiers suitable for this purpose known to those so skilled in the art.

In addition, ionic co-emulsifiers when incorporated into the bilayer provide electrostatic repulsions which will further increase the swelling effect to immobilize more water. The ionic co-emulsifiers of the present remain may include, but are not limited to, SSL and DATEM or combinations thereof and other emulsifiers suitable for this purpose known to those so skilled in the art.

Mono- and diglycerides are formed in the intestinal tract as a result of the normal digestion of triglycerides and are also found naturally in minor amounts in all vegetable oils. As a result they are generally recognized as safe (GRAS). In particular, the diesters, which are quite lipophilic, can co-crystallize within the triglyceride network of the liquid vegetable oil. Monoesters of glycerides have reduced solubility in fats and begin to crystallize at even higher temperatures (e.g., 120°-130° F.), providing crystal seeding.

Mono- and diglycerides can be commercially prepared from edible fats and oils of animal or vegetable origin. The manufacturing process involves a reaction of fat (triglycerides) and glycerin or glycerol, typically in the presence of heat and a catalyst:

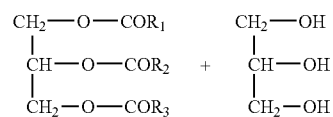

Thus, the above reaction, via heat and catalysis, yields triglycerides, 1,3-diglycerides, 1,2-diglycerides, 1-monoglycerides, 2-monglycerides, and glycerol. Selection for a monoglyceride fraction from the reaction, having properties as herein discussed, can be done without undue experimentation, from the knowledge in the art, and this disclosure, including documents cited herein or incorporated herein by reference. More specifically, the reaction is carried out at approximately 200° C. (392° F.) in the presence of a catalyst such as an alkaline catalyst (see, e.g., Lauridsen, supra; Feuge and Bailey: Modification of Vegetable Oils. VI. The Practical Preparation of Mono- and Diglycerides. Oil and Soap 23:259-264 (1946)). The reaction product is a mixture of mono- and diglycerides and triglycerides with minor quantities of free glycerol and free fatty acids, as depicted above and in Lauridsen, supra. The reaction mixture is then processed through to remove the remaining glycerol and to reduce the level of free fatty acids. The processing can comprise distillation. Thereafter, an acid is added to neutralize the catalyst. The degree of glycerolysis/interesterification upon equilibrium is determined by the ratio of triglycerides to glycerol.

Products from the foregoing reaction and/or mono- and diglyceride of the invention and useful in the practice of the invention contain, consist essentially of, or consist of a minimum monoglyceride content, by weight, of preferably greater than or up to about 45%, advantageously, greater than or up to 70%, more preferably greater than or up to 80%. Products meeting these specifications or employing these mono- and diglycerides, e.g., in a shortening system, for instance, in place of partially hydrogenated fats or oils, may be considered "conserved trans". Such mono- and diglycerides are advantageously blended with oil, such as vegetable oil, e.g., unhydrogenated or non-hydrogenated and/or highly unsaturated vegetable oil, or otherwise employed as one employs mono- and diglycerides, for instance, as discussed herein. Further, as demonstrated herein, saturated fat is also conserved by the instant invention.

When blended with oil, such as vegetable oil, e.g., unhydrogenated or non-hydrogenated and/or highly unsaturated vegetable oil, the system or composition may be considered a shortening system or composition. A shortening system or composition of the invention advantageously contains, by weight, 3-10%, advantageously 3-7%, preferably, 4-6%, such as 5%, of herein discussed emulsifier composition. The emulsifier composition provides stabilization of liquid oil in the shortening system, by the formation of a crystalline network that entrains and suspends liquid oil, thereby providing favorable mouth feel attributes, such as clean get away, melt down, and flavor release. Shortening systems of the invention can allow for an ingredient declaration that avoids the listing of hydrogenated fats or oils or tropical fats, such as palm oil which are high in saturated fats, and can provide for the conservation of trans as well as saturated fats. Thus, the invention provides a shortening system comprising an admixture of at least one non-hydrogenated vegetable oil and the emulsifier composition. The mono- and diglyceride of emulsifier composition may advantageously be obtained from the glycerolysis of a fat or oil. In shortening systems of the invention, there can be plant fat selected from the group consisting of vegetable oils high in polyunsaturation, such as soybean oil or canola oil that have been partially and selectively hydrogenated. And, in shortening systems of the invention, the vegetable oil can selected from the group consisting of sunflower oil, soybean oil, corn oil, cottonseed oil, safflower oil, canola oil and olive oil.

The monoglyceride and/or diglyceride or mono- and diglyceride of the shortening system advantageously comprises, or consists essentially of, or consists of, a minimum monoglyceride content of greater than or up to about 45% by weight, such as greater than or up to about 50% by weight, for instance, greater than or up to about 55% by weight, e.g., greater than or up to about 60% by weight, advantageously greater than or up to about 65% by weight, preferably greater than or up to about 70% by weight, such as greater than or up to about 75% by weight, for instance, greater than or up to about 80% by weight, most advantageously a product that is considered a monoglyceride. Thus, it can be said that it is preferred that the monoglyceride and/or diglyceride be predominantly monoglyceride, or more preferably, monoglyceride.

The monoglyceride and/or diglyceride or mono- and diglyceride of the shortening system comprises or consists essentially of a mixture of esters comprising or consisting essentially of: (a) saturated monoglycerides (e.g., glycerol monostearate (C18:0) or glycerol monopalmitate or combinations thereof); (b) glycerol mono oleate (C18:1 cis); and (c) glycerol monoeladiate (C18:1 trans).

The mono- and diglyceride of the invention can be used in the same fashion as other mono- and diglycerides.

Alpha tending emulsifiers of the present invention may include propylene glycol esters, lactic acid esters, acetic acid esters, or combination thereof. The propylene glycol esters of fatty acids or propylene glycol monoesters of fatty acids advantageously comprises, or consists essentially of, or consists of, a minimum propylene glycol monoester content of greater than or up to about 50% by weight, such as greater than or up to about 60% by weight, for instance, greater than or up to about 70% by weight, e.g., greater than or up to about 80% by weight, advantageously greater than or up to about 90% by weight, most advantageously a product that is considered a propylene glycol ester of fatty acids. Thus, it can be said that it is preferred that the propylene glycol ester of fatty acids be predominantly propylene glycol monoesters of fatty acids, or more preferably, propylene glycol monoesters.

The propylene glycol esters of fatty acids or propylene glycol monoesters of fatty acids in the shortening system comprises or consists essentially of a mixture of esters comprising or consisting essentially of saturated (e.g., stearate (C18:0) or palmitate (C16:0) or combinations thereof) with minor levels of oleate (C18:1 cis); and eladiate (C18:1 trans).

Propylene glycol esters may be manufactured by esterifying propylene glycol with edible fatty acids under alkaline catalysis at about 200° C. under vacuum. After removal of excess propylene glycol the reaction blend contains approximately 55-72% propylene monoesters. An alternative method may be interesterification of triglycerides and propylene glycol yielding a reaction mixture containing the propylene glycol mono- and diesters, together with 8-12% monoglycerides along with small amounts of diglycerides and triglycerides. The propylene glycol monoesters, manufactured by either process, may be concentrated by molecular distillation to up to or greater than 90%.

Acetic acid esters may include mixed glycerol esters of acetic acid and fatty acids. Specifically, acetic acid esters may be acetylated mono- and diglycerides contain mono- and some di-esters of fatty acids with glycerol which is itself partially acetylated.

Lactic acid esters may include mixed glycerol esters of lactic acid and fatty acids.

Ionic emulsifiers may include SSL and DATEM. SSL may be manufactured by the esterification of stearic acid with lactic acid in the presence of sodium hydroxides yielding a mixture of stearoyl-lactylates (sodium salts), fatty acid salts, and free fatty acids.

In addition, DATEM may include esters manufactured by the interaction of diacetyl tartaric anhydride with monoglycerides, or with mono-diglyceride mixture made from edible oils, fats or fatty acids therefrom.

The above compounds, propylene glycol esters, lactic acid esters, acetic acid esters, SSL and DATEM, are well known to a practitioner of this art and are obtainable either commercially or by modification of known synthetic techniques, such as those found in Chemical Abstracts, a source that is well-known and used by a practitioner in the field.

The inventive emulsifier composition may include about 10-70 parts by weight mono- and diglycerides, about 20-70 parts by weight alpha tending emulsifier and less than about 15 parts by weight ionic co-emulsifier.

Shortening systems of the present invention can be used instead of conventional partially hydrogenated fats or oils in various types of foodstuffs or food products, and can be used as a delivery system for an emulsifier.

Commonly owned U.S. application Ser. No. 60/475,590, filed Jun. 4, 2003, hereby incorporated by reference, by the same inventor as herein, involves the role of glycerol mono elediate to form crystals along with the saturated esters (glycerol mono stearate, glycerol mono palmitate) wherein the low solids gel that forms from this system entrains the liquid oil but also melts quickly providing desired eating properties such as flavor release, tenderness, and quick/clean meltdown.

In addition, commonly owned U.S. application Ser. No. 60/496,804, filed Aug. 21, 2003, hereby incorporated by reference, by the same inventor as herein, involves the mono- and diglycerides containing saturated esters (e.g., palmitic, stearic, combinations thereof) as the major fraction, with appreciable amounts of both glycerol monooleate and glycerol mono eladiate. The addition of the unsaturated esters of the monoglycerides help moderate the nucleation of the saturated esters to allow processing and stability of the oil during product storage. Without the unsaturated esters, the low solids gel that forms from the crystallization may be unstable.

The invention is further described by, and a better understanding of the present invention and of its many advantages will be had from, the following examples, given by way of illustration.

EXAMPLES

Example 1

Emulsifier Composition

The emulsifier composition of the present invention may be prepared by any suitable method known in the art. The individual components may be either obtained commercially or by modification of known synthetic techniques, such as those found in Chemical Abstracts, a source that is well-known and used by a practitioner in the field. For example, the emulsifier composition may include mono- and diglycerides, alpha tending emulsifiers, such as propylene glycol esters, lactic acid esters, acetic acid esters or combinations thereof, and an ionic co-emulsifiers, such as SSL, DATEM, lecithin, or combinations thereof.

The physical and chemical attributes for the emulsifier composition of 50 parts by weight monoglyceride, 45 parts by weight propylene glycol esters of fatty acids and 5 parts by weight SSL, would typically consist as follows:

| Physical and chemical attributes | |
|---|---|
| Monoglyceride content (%) | 47.0 |
| Propylene glycol monoesters (%) | 44.1 |
| Sodium stearoyl lactylate (%) | 5.0 |
| Free fatty acid (% as oleic) | 1.6 |
| Free propylene glycol (%) | 0.2 |
| Free glycerol (%) | 0.2 |
| Trans fatty acid (%) | <5.0 |

Example 2

Shortening Containing Emulsifier Composition

The inventive shortening containing 95% by weight fully refined soybean oil was combined with 5% by weight of the emulsifier composition, as in Example 1. The inventive shortening may be formed by any suitable method known to those so skilled in the art. The physical and chemical attributes for the inventive shortening would typically consist as follows:

| Physical and chemical attributes | |
|---|---|
| Free fatty acid (% as oleic) | .089 |
| Monoglyceride content (%) | 2.35 |
| Propylene glycol monoesters (%) | 2.20 |
| Sodium stearoyl lactylate (%) | 0.25 |

The inventive shortening is prepared by physically blending the fully refined soybean oil with the mono- and diglycerides, propylene glycol esters of fatty acids, and sodium stearoyl lactylate at a temperature of 65° C. to allow solubilization of the emulsifier components. This blend is then passed through a scrape surface heat exchanger and cooled to a temperature of 20° C. to allow rapid crystallization of the emulsifier components. Upon exiting the scrape surface heat exchanger, the blend is passed through a post tempering tank for a minimum of 1 hour with gentle agitation to form a stable and dispersed crystalline network.

Example 3

Cookie Formulation

In general, a wide variety of cookies may be manufactured with regard to formulation and processing. Fats and shortenings not only play an important role during processing, but also in the eating quality and stability of the finished product by providing such functions as lubrication, shortening texture, and controlling spread. Depending on the type of cookie, machining of the dough may involve a variety of methods including wire cutting, sheeting, extrusion, or rotary molding. Traditionally, butter and partially hydrogenated shortenings have been utilized as a fat source for ease of processing. In addition, emulsifiers such as mono- and diglycerides and/or lecithin may be included with or in these shortenings to improve lubricity and shortness. For the commercial manufacturer, replacement of these shortenings with non-hydrogenated or liquids oils in the formulation result in many processing challenges as the dough becomes very soft and sticky and difficult to machine. Also, the oil may separate quite readily from the dough or the like. This is a further complication because in many manufacturing facilities the dough may rest for significant amounts of time after mixing. Incorporation of simply mono- and diglycerides and/or lecithin into these liquid oil systems do not significantly improve the machineability of the dough, as again the dough is too sticky or long in texture.

To evaluate the inventive shortening composition of Example 2, a model formulation for a cookie is prepared. In this example, the inventive shortening described in Example 2 is employed as the fat system.

| SUGAR COOKIE FORMULATION | | |
|---|---|---|
| | INGREDIENTS | GRAMS |
| GROUP 1 | NFDM: NON-FAT DRY MILK POWDER | 2.25 |
| | SALT | 2.81 |
| | FGS: SUCROSE, FINE GRANULATION | 94.50 |
| | SODA: SODIUM BICARBONATE | 2.25 |
| | INVENTIVE SHORTENING SYSTEM, EXAMPLE #2 | 90.00 |
| GROUP 2 | AMMONIUM BICARBONATE | 1.13 |
| | HFCS: HIGH FRUCTOSE CORN SYRUP | 3.38 |
| | WATER | 49.50 |
| GROUP 3 | FLOUR | 225.00 |

The mixing procedure for these Groups is as follows:

Stage 1

Group 1: blend dry ingredients (NFDM, salt, soda, FGS) add to fat, and mix in Hobart mixer 3 minutes at low speed, scrape paddle and sides of bowl after each minute of mixing.

Stage 2

Group 2: dissolve ammonium bicarbonate in tap water to form a first solution, add first solution to HFCS to form second solution, add second solution to product from Stage 1, follow Group 1 mixing procedure, mix for 1 minute at low speed, scraping bowl and paddle after 30 second intervals, and mix for 2 minutes at medium speed, scraping bowl and paddle after 30 second intervals.

Stage 3

Group 3: add flour to product from Stage 2, follow Group 2 mixing procedure, fold into liquid mixture 3 times, and mix for 2 minutes at low speed, scraping bowl and paddle after 30 second intervals.

After mixing is complete, the dough is allowed to sit for 10 minutes to observe oil retention.

Thereafter, the dough is sheeted out to a thickness of 7 mm with a rolling pin and gauge bars. Using a round cutter (60 mm), the cookies pieces are placed on an aluminum baking sheet and baked at 400° F. for 12 minutes. After baking, the cookies are allowed to cool to ambient temperature.

The cookies are then evaluated for organoleptic properties (texture/flavor release), oil retention, spread and stack height.

Observations

Upon resting for 10 minutes, no oil was observed to be separating and cutting. The dough, although slightly soft and oily to the touch, has a very short texture and maintained good Theological properties for sheeting and cutting. In addition, the dough has excellent cohesiveness. Further, the baked cookies have excellent bite tenderness and negligible oil prints comparable with partially hydrogenated shortening. Also, the spread and stack characteristics were comparable to spread and stack characteristics of partially hydrogenated shortening.

Example 4

Pie Dough Formulation

Fats and shortenings are incorporated in doughs to shorten the texture so that the finished products are less firm, but more importantly to develop a pleasant flaky or mealy texture. Traditionally, lard has been used in pie dough production. However, partly hydrogenated shortening gained acceptance as consumers became concerned with saturated fat consumption.

Fat levels in pie dough may range from 15% to over 70% based on flour weight. These levels vary with the type of product desired, type of processing equipment used, and shelf life requirements of the finished product. During mixing of dough, there is great competition for the water or aqueous phase with the flour. The aqueous phase quickly interacts with the flour protein to create gluten, which forms a cohesive and extensible network, which is undesirable for pie dough. When the surface of flour is coated with fat, absorption is reduced and a less cohesive gluten network is formed. In this sense, the fat serves to shorten the texture by minimizing water take-up by the flour. This explains why pie dough is mixed in the manner as described below—flour and shortening are added together and blended, giving a coating effect upon the flour surface. Water is added at the last stage of mixing, and mixing is held to a minimum after the water addition. This is done to minimize any gluten development.

Pie dough manufactured with partly hydrogenated shortening or lard results in dough which is opaque, soft, pliable and has a short texture but not sticky. Dough should have this soft texture to be thinly sheeted and pressed, or stamped, into a piecrust shape.

On the other hand, pie dough formulated with fully refined oils or fully refined oils containing mono- and diglycerides result in dough which is soft, sticky, oily and difficult to handle and to machine. The dough will have a translucent appearance, and this translucent appearance will carry through to the finished or baked pie dough, giving an undesirable appearance. Liquid oil will slowly ooze from the dough and will increase as the dough is handled or processed. Dough with this texture would be impossible to process on automated equipment.

To evaluate an inventive shortening composition as in Example 2, a model formulation for a pie is prepared. In this example, the inventive shortening described in Example 2 is employed as the fat system.

| PIE DOUGH FORMULATION | | |
| --- | --- | --- |
| | INGREDIENTS | GRAMS |
| GROUP 1 | PASTRY FLOUR | 500.0 |
| | DEXTROSE | 18.0 |
| | SALT | 15.0 |
| | INVENTIVE SHORTENING SYSTEM, EXAMPLE #2 | 155.0 |
| GROUP 2 | WATER | 200.0 |

The mixing procedure for these Groups is as follows:

Stage 1

Group 1: blend dry ingredients (pastry flour, dextrose, salt) add to fat, and mix in Hobart mixer for 1 minute at low speed, scrape paddle and sides of bowl after each minute of mixing.

Stage 2

Group 2: add water and blend for 20 to 30 seconds on low speed.

Thereafter, the dough is sheeted out to a thickness of 3/16" with a rolling pin and gauge bars. The dough may be placed in pie tin and dock.

The dough may then be further processed as desired, for example, into a traditional pie or co-extruded with a filling. This dough may be further baked or used for a fried pie application.

Observation

Pie dough produced using the inventive shortening system described in Example 2, is similar to dough formulated with partially hydrogenated shortening and superior to a dough formulated with fully refined oil. No oil separation was observed during resting. Further, the dough machined well. In addition, the baked pie dough has acceptable appearance, texture, eating and shelf life qualities, when compared to dough formulated with partially hydrogenated oil.

Overall, the inventive shortening provides ease of processing and machining, appropriate short texture eating quality and prevents pie filling from leeching into or softening the baked dough.

Example 5

Toaster Pastries Formulation

Fats and shortenings are incorporated in pastry dough to shorten the texture so that the finished products are less firm and have a pleasant flaky or layered texture. Traditional partially hydrogenated fats have been utilized in pastry dough.

Fat levels in pastry dough can range from 15% to over 25% based on flour weight. These levels vary with the type of finished product desired.

After mixing, toaster pastry dough is processed through a series of sheeting rolls to slowly reduce the thickness of the dough. The dough is then laminated or layered upon itself. The layered dough is then reduced in size with sheeting rolls to a final thickness for processing. This layering process gives the finished product a flaky or layered effect. A bottom layer of dough is topped with various fillings and a separate top layer of dough is placed on top of the filling. The edges are crimped to prevent the filling from spilling from the pastry. The pastry is then partially baked and packaged.

Doughs with fully refined oils or with fully refined oils containing mono- and diglycerides for making pastries suffer the same shortcoming as the dough used to make pie mentioned above.

In this example of a toaster pastry formulation, the inventive shortening described in example #2 is employed as the fat system.

| TOASTER PASTRY FORMULATION | | |
|---|---|---|
| | INGREDIENTS | GRAMS |
| GROUP 1 | GRANULATED SUGAR | 120.0 |
| | HIGH FRUCTOSE CORN SYRUP | 60.0 |
| | GLYCERIN | 15.0 |
| | SALT | 6.6 |
| | INVENTIVE SHORTENING SYSTEM, EXAMPLE #2 | 102.0 |
| | BAKING SODA | 7.5 |
| | AMMONIUM BI-CARBONATE | 7.5 |
| | MONO CALCIUM PHOSPHATE | 6.6 |
| | COOKIE FLOUR | 600.0 |
| GROUP 2 | WATER | 120.0 |

The mixing procedure for these Groups is as follows:

Stage 1
Group 1: cream ingredients for 1 minute on low blend.
Stage 2
Group 2: add water and mix 4 minutes on low speed.
Thereafter, the dough is sheeted out to give 2 three-fold rolls.

Stage 3
The dough is baked for 6 minutes at 400° F. in an impingement oven.
The pasties are then evaluated for organoleptic properties (texture/flavor release), oil retention, spread and stack height.

Observations

Upon resting, no oil was observed to be separating. The dough, although slightly soft and oily to the touch has a short texture which allows acceptable sheeting and laminating properties. In addition, the dough was slightly more translucent than dough with partly hydrogenated shortening. Further, the baked product has acceptable appearance, flakiness, eating and shelf life qualities, when compared to dough with partly hydrogenated shortening.

Example 6

Nutritional Panel—Kellogg Nutri Grain Bar

| NUTRITIONAL FACTS FOR FAT COMPOSITION | FAT SYSTEM: PARTIALLY HYDROGENATED SOYBEAN OIL (SBO) | FAT SYSTEM FULLY REFINED SBO WITH 4% OF DESCRIBED EMULSIFIER COMPOSITION OF EXAMPLE 1; AN INVENTIVE SHORTENING SYSTEM | FAT SYSTEM FULLY REFINED SBO WITH 6% OF DESCRIBED EMULSIFIER COMPOSITION OF EXAMPLE 1; AN INVENTIVE SHORTENING SYSTEM |
|---|---|---|---|
| SERVING SIZE (GRAMS) | 37 | 37 | 37 |
| TOTAL FAT/SERVING (GRAMS) | 3 | 3 | 3 |
| SATURATED FAT (GRAMS) | 0.5 | 0.552 | 0.603 |
| TRANS FAT (GRAMS) | 1 | | |
| CIS MONOUNSATURATED FAT (GRAMS | 1 | 0.69 | 0.675 |
| POLYUNSATURATED FAT (GRAMS) | 0.5 | 1.758 | 1.719 |

Example 7

Nutritional Panel—Nabisco Nilla Wafers

| NUTRITIONAL FACTS FOR FAT COMPOSITION | FAT SYSTEM: PARTIALLY HYDROGENATED SOYBEAN OIL (SBO) | FAT SYSTEM FULLY REFINED SBO WITH 4% DESCRIBED EMULSIFIER COMPOSITION OF EXAMPLE 1; AN INVENTIVE SHORTENING SYSTEM | FAT SYSTEM FULLY REFINED SBO WITH 6% OF DESCRIBED EMULSIFIER COMPOSITION OF EXAMPLE 1; AN INVENTIVE SHORTENING SYSTEM |
|---|---|---|---|
| SERVING SIZE (GRAMS) | 30 | 37 | 37 |
| TOTAL FAT/SERVING (GRAMS) | 6 | 6 | 6 |
| SATURATED FAT (GRAMS) | 1 | 1.104 | 1.206 |
| TRANS FAT (GRAMS) | 2 | | |
| CIS MONOUNSATURATED FAT (GRAMS | 2 | 1.38 | 1.35 |
| POLYUNSATURATED FAT (GRAMS) | 1 | 3.516 | 3.438 |

Example 8

Nutritional Panel—Kellogg's Pop Tarts

| NUTRITIONAL FACTS FOR FAT COMPOSITION | FAT SYSTEM: PARTIALLY HYDROGENATED SOYBEAN OIL (SBO) | FAT SYSTEM FULLY REFINED SBO WITH 4% DESCRIBED EMULSIFIER COMPOSITION OF EXAMPLE 1; AN INVENTIVE SHORTENING SYSTEM | FAT SYSTEM FULLY REFINED SBO WITH 6% OF DESCRIBED EMULSIFIER COMPOSITION OF EXAMPLE 1; AN INVENTIVE SHORTENING SYSTEM |
|---|---|---|---|
| SERVING SIZE (GRAMS) | 50 | 37 | 37 |
| TOTAL FAT/SERVING (GRAMS) | 6 | 6 | 6 |
| SATURATED FAT (GRAMS) | 1 | 1.104 | 1.206 |
| TRANS FAT (GRAMS) | 2 | | |
| CIS MONOUNSATURATED FAT (GRAMS | 2 | 1.38 | 1.35 |
| POLYUNSATURATED FAT (GRAMS) | 1 | 3.516 | 3.438 |

Example 9

Nutritional Panel—Keebler Sandies, Simply Shortbread

| NUTRITIONAL FACTS FOR FAT COMPOSITION | FAT SYSTEM: PARTIALLY HYDROGENATED SOYBEAN OIL (SBO) | FAT SYSTEM FULLY REFINED SBO WITH 4% DESCRIBED EMULSIFIER COMPOSITION OF EXAMPLE 1; AN INVENTIVE SHORTENING SYSTEM | FAT SYSTEM FULLY REFINED SBO WITH 6% OF DESCRIBED EMULSIFIER COMPOSITION OF EXAMPLE 1; AN INVENTIVE SHORTENING SYSTEM |
|---|---|---|---|
| SERVING SIZE (GRAMS) | 16 | 37 | 37 |
| TOTAL FAT/SERVING (GRAMS) | 4.5 | 4.5 | 4.5 |
| SATURATED FAT (GRAMS) | 1.5 | 0.828 | 0.9045 |
| TRANS FAT (GRAMS) | 1.5 | | |
| CIS MONOUNSATURATED FAT (GRAMS | 1 | 1.035 | 1.0125 |
| POLYUNSATURATED FAT (GRAMS) | 0.5 | 2.637 | 2.5785 |

Examples 6-9 demonstrate that commercially available products made with inventive shortening systems have a more favorable fat profile, using the suggested nutritional panel; and that the invention can improve the fat content, e.g., trans fat content, of a foodstuff or the labeling or disclosure thereof, e.g., nutrition panel for the foodstuff, by substituting partially hydrogenated fat or oil of the foodstuff (currently employed in the preparation of the foodstuff) with a shortening system of the present invention. The current considerations of the US Food & Drug Administration (FDA) for a product nutritional panel is that any constituent less than 0.5/grams/serving does not require declaration; and thus, all of the inventive shortening systems with either 4 or 6% would provide a trans level below the declaration requirement.

Example 10

Tortilla Formulation

Fats and shortenings are incorporated into tortillas to aid in dough lubricity, which improves processing and expansion during baking. Fats also improve eating quality by tenderizing the baked crumb and improve shelf life. In addition, fats and shortenings may reduce or prevent tortillas from sticking to each other during packaging.

Traditionally, lard, tallow, or partially hydrogenated fats, with or without emulsifiers, such as mono- and diglycerides and/or polysorbates, have been used in tortilla dough. Such fat systems may be used in a plastic form or in a liquid molten form. The liquid molten form may be preferable as it is easier and less labor intensive for the manufacturer to handle. Fat levels in tortilla dough may range from 2% to 20% based on flour weight. These levels vary with the type of finished product desired (e.g. low fat).

For the commercial manufacturer, replacement of these shortenings with a non-hydrogenated or liquid oil in the formulations may result in many processing challenges as the dough is difficult to machine which may reduce the quality of the finished product.

After the ingredients are mixed, the tortilla dough is processed through one of three methods. The first method involves a series of sheeting rolls to slowly reduce the thickness of the dough. The dough is then die cut to create a round tortilla shape. The second method involves a hot press. The dough is rounded into individual dough balls and pressed using two hot plates. The third method involves stretching tortilla dough. The tortilla dough may be stretched entirely by hand or a semi-automated method.

In all of the methods, after the tortilla rounds are formed, they travel through a heated oven. After baking, the tortillas may be packaged or may be further processed by rolling or folding in fillings.

To evaluate an inventive shortening composition as in Example 2, a model formulation for a tortilla is prepared. In this example, the inventive shortening described in Example 2 is employed as the fat system.

TORTILLA FORMULATION

| INGREDIENTS | GRAMS |
|---|---|
| FLOUR | 1500.0 |
| GRANULATED SUGAR | 30.0 |
| SALT | 33.8 |
| SODIUM BICARBONATE | 15.0 |
| SODIUM ACID PYROPHOSPHATE 28 | 6.8 |
| FUMARIC ACID | 9.8 |
| POTASSIUM SORBATE | 4.5 |
| PANODAN POWERBAKE 808 | 6.0 |
| CALCIUM PROPIONATE | 15.0 |
| INVENTIVE SHORTENING SYSTEM (Example #2) | 135.0 |
| WATER | 810.0 |

The mixing procedure for the formulation was as follows:
Stage 1
  Mix ingredients for 1 minute on low speed and 15 minutes on medium speed.
Stage 2
  Thereafter, the dough is processed on flour tortilla equipment according to the manufacturer's direction.
Stage 3
  The tortilla rounds may then be baked according to the oven manufacturer's direction.
  Observation The tortilla dough produced using the inventive shortening system (Example #2) is similar to dough formulated with partially hydrogenated emulsified shortening and superior to a dough formulated with the liquid or fully refined vegetable oil. Both tortilla doughs process equally well. However, the baked tortilla made with fully refined vegetable oils yields an excessively translucent tortilla with poor eating characteristics and reduced shelf life. In addition, the baked tortilla made with the inventive shortening system has acceptable or better folding, rolling, appearance, texture, eating, and shelf life qualities compared with tortillas formulated with partially hydrogenated emulsified shortening.

Overall, the inventive shortening system provides ease of processing and machining, appropriate eating quality and does not break, crack or tear when folded or rolled with filling inside.

In addition, the Examples show that the saturated fat content from the inventive shortening systems is conserved with relation to the current fat systems.

The invention is further described by the following numbered paragraphs:

1. A shortening system that contains, or consists essentially of, or consists of, an unhydrogenated or non-hydrogenated, highly unsaturated, vegetable oil, e.g., sunflower oil, rice bran oil, soybean oil, corn oil, cottonseed oil, safflower oil, canola oil, olive oil, or blends thereof, advantageously cottonseed oil, sunflower, oil, soybean oil or blends thereof, and an emulsifier composition advantageously composed of mono- and diglycerides, an alpha tending emulsifier and an ionic co-emulsifier.

2. The shortening system of paragraph 1 wherein the alpha tending emulsifier may be propylene glycol esters, lactic acid esters and acetic acid esters or combinations thereof.

3. The shortening system of paragraph 1 wherein the ionic co-emulsifier may be sodium stearoyl lactylate, diacetyl tartaric acid esters of monoglycerides, lecithin or combinations thereof.

4. A method for preparing a shortening composition of paragraph 1 or as herein discussed by the physical blending or admixing of the non-hydrogenated vegetable oil and the emulsifier composition preferably with mechanical agitation.

5. The method of paragraph 4 wherein the mono- and diglyceride, alpha tending emulsifier preferably propylene glycol esters and the ionic co-emulsifier preferably sodium stearoyl lactylate are preferably heated to an elevated temperature sufficient to provide liquidity, e.g., to within plus or minus 10° C. of its melting point, and is then added directly into the oil, e.g., non-hydrogenated liquid vegetable oil.

6. The method of paragraph 4 wherein blending is continued until the mono- and diglyceride, alpha tending emulsifier and ionic co-emulsifier are completely in solution, e.g., completely dissolved into the non-hydrogenated liquid vegetable oil.

7. The use of an inventive shortening composition from paragraph 6 directly into a foodstuff at this temperature, or cooled prior to use in a foodstuff.

8. The use of an inventive shortening composition as a liquid, e.g., as a spray, or in an aerosol or atomized form.

9. The method of paragraph 6 further including, consisting essentially of, or consisting of, rapid cooling to a temperature of about 65-90° F. (about 18°-32° C.) to initiate the formation of dispersed fat crystals in the oil prior to adding to other ingredients of a foodstuff.

10. The shortening system of any of the foregoing paragraphs containing, or consisting essentially of, or consisting of, a minor amount of the emulsifier composition such as, by weight (based on the total weight of the shortening composition or system) about 3-about 10% or about 3-about 7% or about 4-about 6% or about 5%; or, less than 6-8% of the emulsifier composition, for example, less approximately 6% or less than approximately 8%, such as from about 1% or about 2% or about 3% to about 5% or about 7% or less than 6% or less than 8%, e.g., about 2% or about 3% or about 4% to approximately 5%.

11. The shortening system of any of the foregoing paragraphs comprising, consisting essentially of, or consisting of, the oil or unsaturated or unhydrogenated or non-hydrogenated, and/or highly unsaturated and non-hydrogenated oil, in an amount by weight (based on the total weight of the composition or system), of more than 94-92%, or of about 97% to about 90%, or of about 97% to about 93%, or of about 96% to about 94%, or of about 95%, or of more than approximately 94%, or of more than approximately 92%; such as a system containing, or consisting essentially of, or consisting of, by weight (based on the total weight of the composition or system) from about 99% to about 95% of the oil, or, about 98% to about 95% of the oil, or, about 97% to about 95% of the oil, or, about 99% to about 93% of the oil, or, about 98% to about 93% of the oil, or, about 97% to about 93% of the oil, or about 96% to about 93% of the oil, or about 95% to about 93% of the oil, or, about 99% to about 94% of the oil, or, about 98% to about 94% of the oil, or, about 97% to about 94% of the oil, or of about 97% to about 95% of the oil; such as more than 92%, more than 94%, about 93%, e.g., about 99% or about 98% or about 97% or about 96% or approximately 95% oil.

12. The shortening system of any of the foregoing paragraphs containing less than the emulsifier composition than the amount of the stearine fraction employed in shortening system of U.S. Pat. No. 5,908,655 and EP1057887A1.

13. The shortening system of any of the foregoing paragraphs wherein the oil and the emulsifier composition are matched to each other; for instance, if the oil of the shortening system is canola oil, the mono- and diglyceride is based upon or of canola oil.

14. The shortening system of any of the foregoing paragraphs wherein mono- and diglyceride is advantageously obtained from the glycerolysis of a fat or oil.

15. The shortening system of any of the foregoing paragraphs which is a multi-component system; namely that as a first component is the oil and as a second component is the emulsifier composition.

16. The shortening system of any of paragraphs 1-15 containing, consisting essentially of or consisting of additional ingredient or ingredients that are typically employed in shortening systems, with the understanding that such additional ingredient or ingredients are not to detract from the novel or basic characteristics of the invention and are not to extend to embodiments found in the prior art.

17. The shortening system of paragraph 16 which contains, consists essentially of or consists of as an antioxidant system, e.g., any desired antioxidant system, such as tocopherol, TBHQ, BHT, or propyl gallate, alone or in combination with metal scavengers such as citric acid, phosphoric acid, EDTA and the like, to increase the stability of the shortening system against oxidative reactions.

18. The shortening system of any of the foregoing paragraphs wherein the mono- and diglyceride comprises, or consists essentially of, or consists of, a minimum monoglyceride content of greater than about 45% by weight, such as greater than about 50% by weight, for instance, greater than about 55% by weight, e.g., greater than about 60% by weight, advantageously greater than about 65% by weight, preferably greater than about 70% by weight, such as greater than about 75% by weight, for instance, greater than about 80% by weight, most advantageously a product that is considered a monoglyceride.

19. The shortening system of any of the foregoing paragraphs wherein emulsifier composition includes about 10-70 parts by weight mono- and diglycerides, about 20-70 parts by weight alpha tending emulsifier and less than about 15 parts by weight ionic co-emulsifier.

20. A method for preparing a shortening composition comprising admixing an aforementioned mono- and diglyceride, alpha tending emulsifier preferably propylene glycol esters and the ionic emulsifier preferably sodium stearoyl lactylate, of any of the foregoing paragraphs, obtainable from or obtained from the glycerolysis/interesterification of a triglyceride, e.g., mono- and diglycerides from glycerolysis/interesterification having the aforementioned properties, with vegetable oil, advantageously an unhydrogenated or non-hydrogenated, highly unsaturated vegetable oil, e.g., sunflower oil, soybean oil, corn oil, cottonseed oil, safflower oil, canola oil, olive oil, or blends thereof, advantageously soybean oil, cottonseed oil, canola oil or blends thereof, advantageously soybean oil or canola oil.

21. A method for preparing a shortening system or composition comprising: subjecting a triglyceride to glycerolysis/interesterification; isolating a mono- and diglyceride obtainable from or obtained from the glycerolysis/interesterification of any of the foregoing paragraphs and/or having the aforementioned properties, and admixing the isolated monglyceride and/or diglyceride obtainable from the glycerolysis/interesterification of a triglyceride with vegetable oil, e.g., sunflower oil, soybean oil, corn oil, cottonseed oil, safflower oil, canola oil, olive oil, or blends thereof, advantageously soybean oil, cottonseed oil, canola oil or blends thereof, advantageously soybean oil or canola oil.

22. An isolated mono- and diglyceride of any of the foregoing paragraphs and/or having the aforementioned properties, advantageously obtained from or obtainable from the glycerolysis/interesterification of a triglyceride.

23. An isolated mono- and diglyceride comprising, or consisting essentially of, or consisting of, a minimum monoglyceride content of greater than about 45% by weight, such as greater than about 50% by weight, for instance, greater than about 55% by weight, e.g., greater than about 60% by weight, advantageously greater than about 65% by weight, preferably greater than about 70% by weight, such as greater than about 75% by weight, for instance, greater than about 80%, most advantageously a product that is considered a monoglyceride.

24. The isolated mono- and diglyceride of paragraph 23 wherein the mono- and diglyceride contains, consists essentially of, or consists of a minimum monoglyceride content, by weight, of preferably greater than 45%, advantageously, greater than 70%, more preferably greater than 80%.

25. The shortening system of paragraph 24, containing, consisting essentially of, or consisting of, based on weight of the total composition, about 3% to about 10% of the emulsifier composition, e.g., about 3% to about 7%, such as about 3% or about 4% or about 5% or about 6% of the mono- and diglyceride.

26. A shortening system of any of the foregoing paragraphs wherein the vegetable oils is high in polyunsaturation, such as soybean oil, canola oil.

27. A shortening system of any of the foregoing paragraphs wherein the oil has been partially and selectively hydrogenated may be employed.

28. Use of a shortening system of any of the foregoing paragraphs in a foodstuff or use of the emulsifier composition of any of the foregoing paragraphs in a shortening system which is used in a foodstuff.

29. An improved method for preparing such a foodstuff or food product comprising or consisting essentially of or consisting of coating the foodstuff or food product with or topically applying to the foodstuff or food product a shortening system as in any of the foregoing paragraphs.

30. An improved method for improving or increasing shelf life or for improving or enhancing organoleptic properties or mouthfeel or taste of a foodstuff or food product comprising or consisting essentially of or consisting of coating the foodstuff with or topically applying to the foodstuff or food product a shortening system of any of the foregoing paragraphs.

31. A method as in any of the preceding paragraphs wherein the topical application is performed after baking the foodstuff or food product, and prior to any packaging.

32. An improvement in the preparation and packaging of such a foodstuff or food product is coating the foodstuff or food product with, or topically applying to the foodstuff or food product, after baking and before packaging, a shortening system of any of the foregoing paragraphs.

33. A foodstuff containing, coated with, or baked with a shortening system or mono- and diglyceride of any of the foregoing paragraphs.

34. A method for improving the fat content, e.g., trans fat content, of a foodstuff or the labeling or disclosure thereof, e.g., nutrition panel for the foodstuff, comprising, consisting essentially of, or consisting of, substituting partially hydrogenated fat or oil of the foodstuff with a shortening system of any of the foregoing paragraphs.

35. The invention of any of the preceding paragraphs wherein the monoglyceride and/or diglyceride or mono- and diglyceride of the shortening system comprises or consists essentially of a mixture of esters comprising or consisting essentially of: (a) saturated monoglycerides (e.g., glycerol monostearate (C18:0) or glycerol monopalmitate or combinations thereof); (b) glycerol mono oleate (C18:1 cis); and (c) glycerol monoeladiate (C18:1 trans), and wherein, by weight, the mixture advantageously contains or consists essentially of about 40% to about 70%, such as about 45% to about 65%, e.g., about 45% to about 55%, such as about 50% of (a); about 10% to about 40%, such as about 15% to about 35%, e.g., about 20% to about 30%, such as about 25% of (b); and a maximum of about 25% of (c), such as a maximum of about 20% of (c), e.g., a maximum of about 15% or 10% of (c).

36. An emulsifier composition comprising:
    a) mono- and/or di-glycerides of fatty acids;
    b) an alpha tending emulsifier;
    c) an ionic co-emulsifier.

37. An emulsifier composition according to paragraph 36, wherein component a) is present in an amount of between 10 and 70% w/w based on the total weight of the composition.

38. An emulsifier composition according to paragraph 36 or 37, wherein component b) is present in an amount of between 20 and 70% w/w based on the total weight of the composition.

39. An emulsifier composition according to any preceding paragraph, wherein component c) is present in an amount of less than 15% w/w based on the total weight of the composition.

40. An emulsifier composition according to any preceding paragraph wherein component a) has a minimum monoglyceride content of 45% by weight.

41. An emulsifier composition according to any preceding paragraph wherein component a) has a minimum monoglyceride content of 80% by weight.

42. An emulsifier composition according to any preceding paragraph wherein the alpha tending emulsifier of component b) is selected from propylene glycol esters, lactic acid esters, acetic acid esters and combinations thereof.

43. An emulsifier composition according to paragraph 42 wherein component b) is selected from propylene glycol monoesters of fatty acids.

44. An emulsifier composition according to any preceding paragraph wherein ionic co-emulsifier component c) is selected from sodium strearoyl lactylate, diacetyl tartaric acid esters of monoglycerides, lecithin and combinations thereof.

45. A shortening composition comprising
    a) oil; and
    b) an emulsifier composition as paragraphed in any one of paragraphs 36 to 44.

46. A shortening composition according to paragraph 45 comprising at least one non-hydrogenated vegetable oil.

47. A shortening composition according to paragraph 45 or 46 wherein the oil a) is non-hydrogenated vegetable oil.

48. A shortening composition according to any one of paragraphs 45 to 47 wherein the oil a) is selected from sunflower oil, rice bran oil, soybean oil, corn oil, cottonseed oil, safflower oil, canola oil, olive oil or blends thereof.

49. A shortening composition according to any one of paragraphs 45 to 48 wherein the oil a) is present in an amount of more than about 92% based on the total weight of the shortening composition.

50. A shortening composition according to any one of paragraphs 45 to 49 wherein the emulsifier composition b) is present in an amount of 3 to 10% based on the total weight of the shortening composition.

51. A shortening composition according to any one of paragraphs 45 to 50 wherein the oil a) and the emulsifier composition b) are matched to one another.

52. A shortening composition according to any one of paragraphs 45 to 51 comprising additional ingredient or ingredients that are typically employed in shortening compositions.

53. A shortening composition according to paragraph 52 comprising an antioxidant and/or metal scavenger.

54. A shortening composition according to paragraph 53 wherein the antioxidant is selected from the group consisting of tocopherol, TBHQ, BHT, propyl gallate, and combinations thereof.

55. A shortening composition according to paragraph 53 or 54 wherein the metal scavenger is selected from the group consisting of citric acid, phosphoric acid, EDTA and combinations thereof.

56. A shortening composition according to any one of paragraphs 45 to 55 which is a liquid.

57. A shortening composition according to any one of paragraphs 45 to 55 which is in the form of a spray, an aerosol, or atomized form.

58. A process for the preparation of a shortening composition as defined in any one of paragraphs 45 to 57 by the physical blending or admixing of the oil a) and the emulsifier composition b).

59. A process according to paragraph 58 wherein the emulsifier composition b) is heated to a temperature sufficient to provide liquidity, and then added directly into the oil.

60. A process according to paragraph 58 or 59 comprising a further rapidly cooling the shortening composition to a temperature of 18 to 32° C. prior to use.

61. A foodstuff comprising a shortening composition as paragraphed in any one of paragraphs 45 to 57.

62. A foodstuff according to paragraph 61 which is selected from the group consisting of cookies, crackers, tortilla, and baked goods which are sheeted, extruded, and/or laminated.

63. Use of a shortening composition as paragraphed in any one of paragraphs 45 to 57 as a delivery system for an emulsifier.

Having thus described in detail preferred embodiments of the present invention, it is to be understood that the invention defined by the appended claims is not to be limited by particular details set forth in the above description as many apparent variations thereof are possible without departing from the spirit or scope thereof.

The invention claimed is:
1. A shortening composition comprising
   an emulsifier composition and
   an oil, wherein:
   the emulsifier composition is present in an amount of 3 to 7% w/w based on the total weight of the shortening composition and comprises:

(a) mono- and/or di-glycerides of fatty acids present in an amount of between 10 and 70% w/w based on the total weight of the emulsifier composition, (b) an alpha tending emulsifier present in an amount of between 20 and 70% w/w based on the total weight of the emulsifier composition, wherein the alpha tending emulsifier comprises a propylene glycol ester, lactic acid ester, acetic acid ester, propylene glycol monoester of fatty acids, or a combination thereof, and (c) an ionic co-emulsifier comprising sodium stearoyl lactylate present in an amount of less than 15% w/w based on the total weight of the emulsifier composition; and the oil is non-hydrogenated and highly unsaturated vegetable oil present in an amount of more than about 92% w/w based on the total weight of the shortening composition.

2. A shortening composition according to claim 1, wherein component a) has a minimum monoglyceride content of 45% w/w or a minimum monoglyceride content of 80% w/w based on the total weight of the emulsifier composition.

3. A shortening composition according to claim 1, wherein the vegetable oil is sunflower oil, rice bran oil, soybean oil, corn oil, cottonseed oil, safflower oil, canola oil, olive oil, or a blend thereof.

4. A shortening composition according to claim 1 comprising one or more additional ingredient or ingredients that are typically employed in shortening compositions.

5. A shortening composition according to claim 4 comprising an antioxidant and/or metal scavenger.

6. A shortening composition according to claim 5 wherein the oil and the emulsifier composition are matched to one another.

7. A shortening composition according to claim 5, wherein the antioxidant is tocopherol, TBHQ, BHT, propyl gallate, or a combination thereof.

8. A shortening composition according to claim 5, wherein the metal scavenger is citric acid, phosphoric acid, EDTA or a combination thereof.

9. A shortening composition according to claim 1 which is a liquid.

10. A shortening composition according to claim 1 which is in the form of a spray, an aerosol, or atomized form.

11. A process for the preparation of the shortening composition according to claim 1, wherein the oil and the emulsifier composition are physically blended or admixed.

12. A process according to claim 11 wherein the emulsifier composition is heated to a temperature sufficient to provide liquidity, and then added directly into the oil.

13. A process according to claim 11 comprising rapidly cooling the shortening composition to a temperature of 18 to 32° C. prior to use.

14. A method of using the shortening composition according to claim 1 as a delivery system for an emulsifier comprising adding to a mixture in need thereof a shortening composition according to claim 1.

15. A shortening composition comprising
an emulsifier composition and
an oil, wherein:
the emulsifier composition is present in an amount of 3 to 7% w/w based on the total weight of the shortening composition and comprises:
(a) mono- and/or di-glycerides of fatty acids present in an amount of between 10 and 70% w/w based on the total weight of the emulsifier composition;

(b) an alpha tending emulsifier present in an amount of between 20 and 70% w/w based on the total weight of the emulsifier composition, wherein the alpha tending emulsifier comprises a propylene glycol ester, lactic acid ester, acetic acid ester, propylene glycol monoester of fatty acids, or a combination thereof; and (c) an ionic co-emulsifier comprising one or more of diacetyl tartaric acid esters of monoglycerides present in a maximum amount of 10% w/w based on the total weight of the emulsifier composition; and the oil is non-hydrogenated and highly unsaturated vegetable oil present in an amount of more than about 92% w/w based on the total weight of the shortening composition.

16. A shortening composition according to claim 15, wherein component a) has a minimum monoglyceride content of 45% w/w or a minimum monoglyceride content of 80% w/w based on the total weight of the emulsifier composition.

17. A shortening composition according to claim 15, wherein the vegetable oil is sunflower oil, rice bran oil, soybean oil, corn oil, cottonseed oil, safflower oil, canola oil, olive oil or a blend thereof.

18. A shortening composition according to claim 15, wherein the oil and the emulsifier composition are matched to one another.

19. A shortening composition according to claim 15, comprising one or more additional ingredient or ingredients that are typically employed in shortening compositions.

20. A shortening composition according to claim 19, comprising an antioxidant and/or metal scavenger.

21. A shortening composition according to claim 20, wherein the antioxidant is tocopherol, TBHQ, BHT, propyl gallate, or a combination thereof.

22. A shortening composition according to claim 20, wherein the metal scavenger is citric acid, phosphoric acid, EDTA or a combination thereof.

23. A shortening composition according to claim 15, which is a liquid.

24. A shortening composition according to claim 15, which is in the form of a spray, an aerosol, or atomized form.

25. A process for the preparation of the shortening composition according to claim 15, wherein the vegetable oil and the emulsifier composition are physically blended or admixed.

26. A process according to claim 25, wherein the emulsifier composition is heated to a temperature sufficient to provide liquidity, and then added directly into the oil.

27. A process according to claim 25, comprising rapidly cooling the shortening composition to a temperature of 18 to 32° C. prior to use.

28. A method of using a shortening composition according to claim 15 as a delivery system for an emulsifier, comprising adding to a mixture in need thereof a shortening composition according to claim 15.

29. A shortening composition consisting essentially of
an emulsifier composition and
an oil, wherein:
the emulsifier composition is present in an amount of 3 to 7% w/w based on the total weight of the shortening composition and consists essentially of:
(a) mono- and/or di-glycerides of fatty acids present in an amount of between 10 and 70% w/w based on the total weight of the emulsifier composition,
(b) an alpha tending emulsifier present in an amount of between 20 and 70% w/w based on the total weight of the emulsifier composition, wherein the alpha tending emulsifier consists essentially of a propylene glycol ester, lactic acid ester, acetic acid ester, propylene glycol monoester of fatty acids, or a combination thereof, and (c) an ionic co-emulsifier consisting essentially of sodium stearoyl lactylate present in an amount of less than 15% w/w based on the total weight of the emulsifier composition; and the oil is non-hydrogenated and highly unsaturated vegetable oil present in an amount of more than about 92% w/w based on the total weight of the shortening composition.

30. A shortening composition consisting essentially of
an emulsifier composition and
an oil, wherein:
the emulsifier composition is present in an amount of 3 to 7% w/w based on the total weight of the shortening composition and consists essentially of:
(a) mono- and/or di-glycerides of fatty acids present in an amount of between 10 and 70% w/w based on the total weight of the emulsifier composition;
(b) an alpha tending emulsifier present in an amount of between 20 and 70% w/w based on the total weight of the emulsifier composition, wherein the alpha tending emulsifier consists essentially of a propylene glycol ester, lactic acid ester, acetic acid ester, propylene glycol monoester of fatty acids, or a combination thereof; and
(c) an ionic co-emulsifier comprising one or more of diacetyl tartaric acid esters of monoglycerides present in a maximum amount of 10% w/w based on the total weight of the emulsifier composition; and
the oil is non-hydrogenated and highly unsaturated vegetable oil present in an amount of more than about 92% w/w based on the total weight of the shortening composition.

31. A foodstuff comprising a shortening composition, wherein:
the shortening composition comprises:
an emulsifier composition and
an oil, wherein:
the emulsifier composition is present in the shortening composition in an amount of 3 to 7% w/w based on the total weight of the shortening composition, and
the emulsifier composition comprises:
(a) mono- and/or di-glycerides of fatty acids present in the emulsifier composition in an amount of between 10 and 70% w/w based on the total weight of the emulsifier composition,
(b) an alpha tending emulsifier present in the emulsifier composition in an amount of between 20 and 70% w/w based on the total weight of the emulsifier composition, wherein the alpha tending emulsifier comprises a propylene glycol ester, lactic acid ester, acetic acid ester, propylene glycol monoester of fatty acids, or a combination thereof, and
(c) an ionic co-emulsifier comprising sodium stearoyl lactylate present in the emulsifier composition in an amount of less than 15% w/w based on the total weight of the emulsifier composition; and
the oil is non-hydrogenated and highly unsaturated vegetable oil present in the shortening composition an amount of more than about 92% w/w based on the total weight of the shortening composition.

32. A foodstuff according to claim 31, wherein component a) has a minimum monoglyceride content of 45% w/w or a minimum monoglyceride content of 80% w/w based on the total weight of the emulsifier composition.

33. A foodstuff according to claim 31, wherein the vegetable oil is sunflower oil, rice bran oil, soybean oil, corn oil, cottonseed oil, safflower oil, canola oil, olive oil, or a blend thereof.

34. A foodstuff according to claim 31, wherein the oil and the emulsifier composition are matched to one another.

35. A foodstuff according to claim 31, wherein the shortening composition comprises one or more additional ingredient or ingredients that are typically employed in shortening compositions.

36. A foodstuff according to claim 35, comprising an antioxidant and/or metal scavenger.

37. A foodstuff according to claim 36, wherein the antioxidant is tocopherol, TBHQ, BHT, propyl gallate, or a combination thereof.

38. A foodstuff according to claim 36, wherein the metal scavenger is citric acid, phosphoric acid, EDTA or a combination thereof.

39. A foodstuff according to claim 31, wherein the foodstuff is cookies, crackers, tortilla, or baked goods which are sheeted, extruded, and/or laminated.

40. A foodstuff according to claim 31 wherein the shortening composition is prepared by a process comprising physically blending or admixing the oil and the emulsifier composition.

41. A foodstuff according to claim 40 wherein the emulsifier composition is heated to a temperature sufficient to provide liquidity, and then added directly into the oil.

42. A foodstuff according to claim 40 comprising rapidly cooling the shortening composition to a temperature of 18 to 32° C. prior to use.

43. A foodstuff according to claim 31 having a fat profile comprising a trans fat level below 0.5 grams/serving.

44. A method for preparing a foodstuff having a fat profile comprising a trans fat level below 0.5 grams/serving, said method comprising including in the foodstuff, or substituting for partially hydrogenated fat or oil in the foodstuff, an amount of a shortening composition to obtain the trans fat level below 0.5 grams/serving, wherein:
the shortening composition comprises:
an emulsifier composition and
an oil, wherein:
the emulsifier composition is present in the shortening composition in an amount of 3 to 7% w/w based on the total weight of the shortening composition, and
the emulsifier composition comprises:
(a) mono- and/or di-glycerides of fatty acids present in the emulsifier composition in an amount of between 10 and 70% w/w based on the total weight of the emulsifier composition,
(b) an alpha tending emulsifier present in the emulsifier composition in an amount of between 20 and 70% w/w based on the total weight of the emulsifier composition, wherein the alpha tending emulsifier comprises a propylene glycol ester, lactic acid ester, acetic acid ester, propylene glycol monoester of fatty acids, or a combination thereof, and
(c) an ionic co-emulsifier comprising sodium stearoyl lactylate present in the emulsifier composition in an amount of less than 15% w/w based on the total weight of the emulsifier composition; and
the oil is non-hydrogenated and highly unsaturated vegetable oil present in the shortening composition an amount of more than about 92% w/w based on the total weight of the shortening composition.

45. A method according to claim 44, wherein component a) has a minimum monoglyceride content of 45% w/w or a minimum monoglyceride content of 80% w/w based on the total weight of the emulsifier composition.

46. A method according to claim 44, wherein the vegetable oil is sunflower oil, rice bran oil, soybean oil, corn oil, cottonseed oil, safflower oil, canola oil, olive oil, or a blend thereof.

47. A method according to claim 44, wherein the oil and the emulsifier composition are matched to one another.

48. A method according to claim 44, wherein the shortening composition comprises one or more additional ingredient or ingredients that are typically employed in shortening compositions.

49. A method according to claim 48, wherein the shortening composition comprises an antioxidant and/or metal scavenger.

50. A method according to claim 49, wherein the antioxidant is tocopherol, TBHQ, BHT, propyl gallate, or a combination thereof.

51. A method according to claim 49, wherein the metal scavenger is citric acid, phosphoric acid, EDTA or a combination thereof.

52. A method according to claim 44, wherein the foodstuff is cookies, crackers, tortilla, or baked goods which are sheeted, extruded, and/or laminated.

53. A method according to claim 44 wherein the shortening composition is prepared by a process comprising physically blending or admixing the oil and the emulsifier composition.

54. A method according to claim 53 wherein the emulsifier composition is heated to a temperature sufficient to provide liquidity, and then added directly into the oil.

55. A method according to claim 53 comprising rapidly cooling the shortening composition to a temperature of 18 to 32° C. prior to use.

56. A foodstuff comprising a shortening composition, wherein:
the shortening composition comprises:
an emulsifier composition and
an oil, wherein:
the emulsifier composition is present in the shortening composition in an amount of 3 to 7% w/w based on the total weight of the shortening composition, and
the emulsifier composition comprises:
(a) mono- and/or di-glycerides of fatty acids present in the emulsifier composition in an amount of between 10 and 70% w/w based on the total weight of the emulsifier composition,
(b) an alpha tending emulsifier present in the emulsifier composition in an amount of between 20 and 70% w/w based on the total weight of the emulsifier composition, wherein the alpha tending emulsifier comprises a propylene glycol ester, lactic acid ester, acetic acid ester, propylene glycol monoester of fatty acids, or a combination thereof, and
(c) an ionic co-emulsifier comprising one or more of diacetyl tartaric acid esters of monoglycerides present in the emulsifier composition in a maximum amount of 10% w/w based on the total weight of the emulsifier composition; and
the oil is non-hydrogenated and highly unsaturated vegetable oil present in the shortening composition an amount of more than about 92% w/w based on the total weight of the shortening composition.

57. A foodstuff according to claim 56, wherein component a) has a minimum monoglyceride content of 45% w/w or a minimum monoglyceride content of 80% w/w based on the total weight of the emulsifier composition.

58. A foodstuff according to claim 56, wherein the vegetable oil is sunflower oil, rice bran oil, soybean oil, corn oil, cottonseed oil, safflower oil, canola oil, olive oil or a blend thereof.

59. A foodstuff according to claim 56, wherein the oil and the emulsifier composition are matched to one another.

60. A foodstuff according to claim 56, wherein the shortening composition comprises one or more additional ingredient or ingredients that are typically employed in shortening compositions.

61. A foodstuff according to claim 60, wherein the shortening composition comprises an antioxidant and/or metal scavenger.

62. A foodstuff according to claim 61, wherein the antioxidant is tocopherol, TBHQ, BHT, propyl gallate, or a combination thereof.

63. A foodstuff according to claim 61, wherein the metal scavenger is citric acid, phosphoric acid, EDTA or a combination thereof.

64. A foodstuff according to claim 56, wherein the foodstuff is cookies, crackers, tortilla, or baked foods, which are sheeted, extruded, and/or laminated.

65. A foodstuff according to claim 56, wherein the shortening composition is prepared by a process comprising physically blending or admixing the vegetable oil and the emulsifier composition.

66. A foodstuff according to claim 65, wherein the emulsifier composition is heated to a temperature sufficient to provide liquidity, and then added directly into the oil.

67. A foodstuff according to claim 65, comprising rapidly cooling the shortening composition to a temperature of 18 to 32° C. prior to use.

68. A foodstuff according to claim 56 having a fat profile comprising a trans fat level below 0.5 grams/serving.

69. A method for preparing a foodstuff having a fat profile comprising a trans fat level below 0.5 grams/serving, said method comprising including in the foodstuff, or substituting for partially hydrogenated fat or oil in the foodstuff, an amount of a shortening composition to obtain the trans fat level below 0.5 grams/serving, wherein:
the shortening composition comprises:
an emulsifier composition and
an oil, wherein:
the emulsifier composition is present in the shortening composition in an amount of 3 to 7% w/w based on the total weight of the shortening composition, and
the emulsifier composition comprises:
(a) mono- and/or di-glycerides of fatty acids present in the emulsifier composition in an amount of between 10 and 70% w/w based on the total weight of the emulsifier composition,
(b) an alpha tending emulsifier present in the emulsifier composition in an amount of between 20 and 70% w/w based on the total weight of the emulsifier composition, wherein the alpha tending emulsifier comprises a propylene glycol ester, lactic acid ester, acetic acid ester, propylene glycol monoester of fatty acids, or a combination thereof, and
(c) an ionic co-emulsifier comprising one or more of diacetyl tartaric acid esters of monoglycerides present in the emulsifier composition in a maximum amount of 10% w/w based on the total weight of the emulsifier composition; and the oil is non-hydrogenated and highly unsaturated vegetable oil present in the shortening composition an amount of more than about 92% w/w based on the total weight of the shortening composition.

70. A method according to claim 69, wherein component a) has a minimum monoglyceride content of 45% w/w or a minimum monoglyceride content of 80% w/w based on the total weight of the emulsifier composition.

71. A method according to claim 69, wherein the vegetable oil is sunflower oil, rice bran oil, soybean oil, corn oil, cottonseed oil, safflower oil, canola oil, olive oil or a blend thereof.

72. A method according to claim 69, wherein the oil and the emulsifier composition are matched to one another.

73. A method according to claim 69, wherein the shortening composition comprises one or more additional ingredient or ingredients that are typically employed in shortening compositions.

74. A method according to claim 73, comprising an antioxidant and/or metal scavenger.

75. A method according to claim 74, wherein the metal scavenger is citric acid, phosphoric acid, EDTA or a combination thereof.

76. A method according to claim 73, wherein the antioxidant is tocopherol, TBHQ, BHT, propyl gallate, or a combination thereof.

77. A method according to claim 69, wherein the foodstuff is cookies, crackers, tortilla, or baked foods, which are sheeted, extruded, and/or laminated.

78. A method according to claim 69, wherein the shortening composition is prepared by a process comprising physically blending or admixing the vegetable oil and the emulsifier composition.

79. A method according to claim 78, wherein the emulsifier composition is heated to a temperature sufficient to provide liquidity, and then added directly into the oil.

80. A method according to claim 78, comprising rapidly cooling the shortening composition to a temperature of 18 to 32° C. prior to use.

81. A foodstuff comprising a shortening composition, wherein:
the shortening composition consists essentially of:
an emulsifier composition and
an oil,
wherein:
the emulsifier composition is present in the shortening composition in an amount of 3 to 7% w/w based on the total weight of the shortening composition and consists essentially of:
(a) mono- and/or di-glycerides of fatty acids present in the emulsifier composition in an amount of between 10 and 70% w/w based on the total weight of the emulsifier composition,
(b) an alpha tending emulsifier present in the emulsifier composition in an amount of between 20 and 70% w/w based on the total weight of the emulsifier composition, wherein the alpha tending emulsifier consists essentially of a propylene glycol ester, lactic acid ester, acetic acid ester, propylene glycol monoester of fatty acids, or a combination thereof, and
(c) an ionic co-emulsifier consisting essentially of sodium stearoyl lactylate present in the emulsifier composition in an amount of less than 15% w/w based on the total weight of the emulsifier composition; and
the oil is non-hydrogenated and highly unsaturated vegetable oil present in the shortening composition in an amount of more than about 92% w/w based on the total weight of the shortening composition.

82. A foodstuff according to claim 81 having a fat profile comprising a trans fat level below 0.5 grams/serving.

83. A foodstuff comprising a shortening composition, wherein:
the shortening composition consists essentially of:
an emulsifier composition and
an oil,
wherein:
the emulsifier composition is present in the shortening composition in an amount of 3 to 7% w/w based on the total weight of the shortening composition and consists essentially of:
(a) mono- and/or di-glycerides of fatty acids present in the emulsifier composition in an amount of between 10 and 70% w/w based on the total weight of the emulsifier composition;
(b) an alpha tending emulsifier present in the emulsifier composition in an amount of between 20 and 70% w/w based on the total weight of the emulsifier composition, wherein the alpha tending emulsifier consists essentially of a propylene glycol ester, lactic acid ester, acetic acid ester, propylene glycol monoester of fatty acids, or a combination thereof; and
(c) an ionic co-emulsifier comprising one or more of diacetyl tartaric acid esters of monoglycerides present in the emulsifier composition in a maximum amount of 10% w/w based on the total weight of the emulsifier composition; and
the oil is non-hydrogenated and highly unsaturated vegetable oil present in the shortening composition in an amount of more than about 92% w/w based on the total weight of the shortening composition.

84. A foodstuff according to claim 83 having a fat profile comprising a trans fat level below 0.5 grams/serving.

85. A method for preparing a foodstuff having a fat profile comprising a trans fat level below 0.5 grams/serving, said method comprising including in the foodstuff, or substituting for partially hydrogenated fat or oil in the foodstuff, an amount of a shortening composition to obtain the trans fat level below 0.5 grams/serving, wherein:
the shortening composition consists essentially of:
an emulsifier composition and
an oil,
wherein:
the emulsifier composition is present in the shortening composition in an amount of 3 to 7% w/w based on the total weight of the shortening composition and consists essentially of:
(a) mono- and/or di-glycerides of fatty acids present in the emulsifier composition in an amount of between 10 and 70% w/w based on the total weight of the emulsifier composition,
(b) an alpha tending emulsifier present in the emulsifier composition in an amount of between 20 and 70% w/w based on the total weight of the emulsifier composition, wherein the alpha tending emulsifier consists essentially of a propylene glycol ester, lactic acid ester, acetic acid ester, propylene glycol monoester of fatty acids, or a combination thereof, and
(c) an ionic co-emulsifier consisting essentially of sodium stearoyl lactylate present in the emulsifier composition in an amount of less than 15% w/w based on the total weight of the emulsifier composition; and the oil is non-hydrogenated and highly unsaturated vegetable oil present in the shortening composition in an amount of more than about 92% w/w based on the total weight of the shortening composition.

86. A method for preparing a foodstuff having a fat profile comprising a trans fat level below 0.5 grams/serving, said method comprising including in the foodstuff, or substituting for partially hydrogenated fat or oil in the foodstuff, an amount of a shortening composition to obtain the trans fat level below 0.5 grams/serving, wherein:

the shortening composition consists essentially of:
an emulsifier composition and
an oil,
wherein:
the emulsifier composition is present in the shortening composition in an amount of 3 to 7% w/w based on the total weight of the shortening composition and consists essentially of:

(a) mono- and/or di-glycerides of fatty acids present in the emulsifier composition in an amount of between 10 and 70% w/w based on the total weight of the emulsifier composition;

(b) an alpha tending emulsifier present in the emulsifier composition in an amount of between 20 and 70% w/w based on the total weight of the emulsifier composition, wherein the alpha tending emulsifier consists essentially of a propylene glycol ester, lactic acid ester, acetic acid ester, propylene glycol monoester of fatty acids, or a combination thereof; and (c) an ionic co-emulsifier comprising one or more of diacetyl tartaric acid esters of monoglycerides present in the emulsifier composition in a maximum amount of 10% w/w based on the total weight of the emulsifier composition; and the oil is non-hydrogenated and highly unsaturated vegetable oil present in the shortening composition in an amount of more than about 92% w/w based on the total weight of the shortening composition.

* * * * *